(12) United States Patent
Natori

(10) Patent No.: US 9,069,497 B2
(45) Date of Patent: Jun. 30, 2015

(54) INFORMATION PROCESSING APPARATUS HAVING RELAY VIRTUAL PRINTER AND FUNCTIONAL RELAY VIRTUAL PRINTER

(75) Inventor: Takuya Natori, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/458,755

(22) Filed: Apr. 27, 2012

(65) Prior Publication Data

US 2012/0307293 A1    Dec. 6, 2012

(30) Foreign Application Priority Data

May 31, 2011    (JP) .................................. 2011-122027

(51) Int. Cl.
*G06F 3/12*    (2006.01)
*H04L 29/08*    (2006.01)

(52) U.S. Cl.
CPC ............ *G06F 3/1205* (2013.01); *G06F 3/1209* (2013.01); *G06F 3/1232* (2013.01); *G06F 3/124* (2013.01); *G06F 3/1245* (2013.01); *G06F 3/1267* (2013.01); *G06F 3/1287* (2013.01); *G06F 3/1288* (2013.01); *H04L 67/02* (2013.01)

(58) Field of Classification Search
CPC ... G06F 3/1205; G06F 3/1207; G06F 3/1222; G06F 3/1238; G06F 3/1253; G06F 3/1287; G06F 3/1288; G06F 3/1206; G06F 3/1209; G06F 3/1211; G06F 3/1232; G06F 3/1247; G06F 3/1267; G06F 3/1204; G06F 3/122; G06F 3/1228; G06F 3/1231; G06F 3/1255; G06F 3/1268; H04L 29/0846; H04N 1/00233; H04N 1/00244

USPC ........................................................ 358/1.15
See application file for complete search history.

(56) References Cited

U.S. PATENT DOCUMENTS 7,167,262 B2 *    1/2007    Muramoto et al. .......... 358/1.15
7,408,666 B2 *    8/2008    Aiyama ....................... 358/1.15

(Continued)

FOREIGN PATENT DOCUMENTS

| CN | 101571792 | 11/2009 |
|---|---|---|
| JP | 2005-278144 | 10/2005 |
| JP | 2006-209430 | 8/2006 |

OTHER PUBLICATIONS

English Machine Translation of JP 2006-209430-A (Sugawara, Published Oct. 8, 2006).*
Chinese Office Action dated Sep. 17, 2014 issued during prosecution of related Chinese application No. 201210170168.8. (Whole English-language translation included.).

(Continued)

*Primary Examiner* — Benny Q Tieu
*Assistant Examiner* — Juan M Guillermety
(74) *Attorney, Agent, or Firm* — Fitzpatrick, Cella, Harper & Scinto

(57) ABSTRACT

A print relay server relays print data generated by a print server to an image forming device. The print relay server includes a relay virtual printer that instructs the corresponding image forming device to print out print data and a functional relay virtual printer that has a function for realizing a specified print service not provided by the print server. The functional relay virtual printer acquires print data from the print server which has generated print data in response to a print request from a client, and instructs an image forming device, which executes a process for realizing the specified print service, to print out print data via the relay virtual printer.

9 Claims, 23 Drawing Sheets

(56) References Cited

U.S. PATENT DOCUMENTS

| | | | |
|---|---|---|---|
| 7,689,830 B2 | 3/2010 | Ishii | |
| 8,351,064 B2 | 1/2013 | Kajiyama | |
| 2003/0184787 A1* | 10/2003 | Kuroda et al. | 358/1.13 |
| 2006/0044593 A1* | 3/2006 | Kawakami et al. | 358/1.14 |
| 2006/0044600 A1* | 3/2006 | Oosawa | 358/1.15 |
| 2012/0268778 A1* | 10/2012 | Nakawaki | 358/1.15 |

OTHER PUBLICATIONS

Japanese Office Action issued Apr. 10, 2015 during prosecution of related Japanese application No. 2011-122027. (Whole English-language translation included.).

* cited by examiner

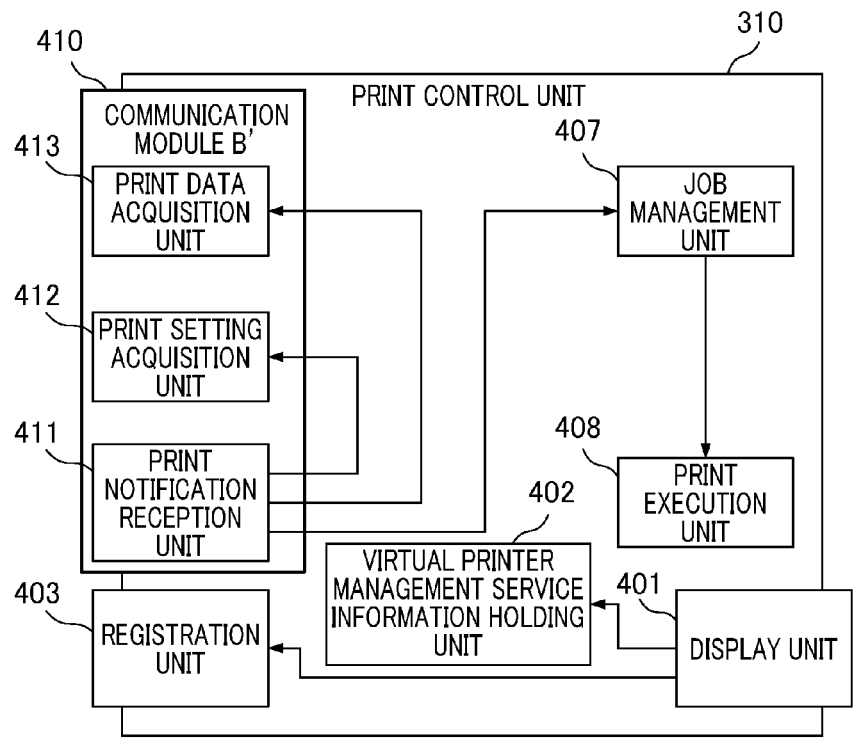
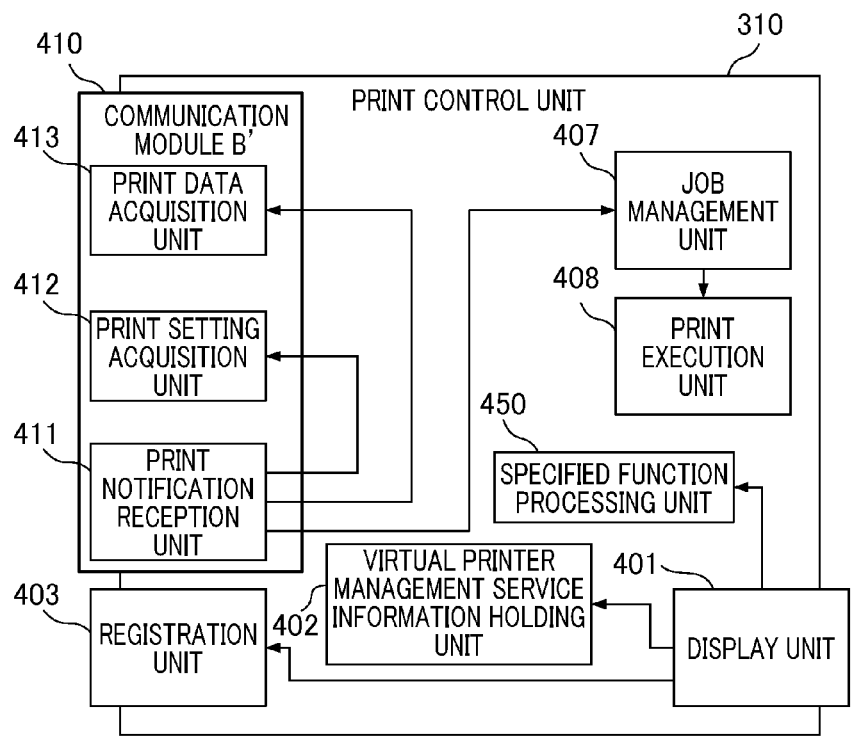

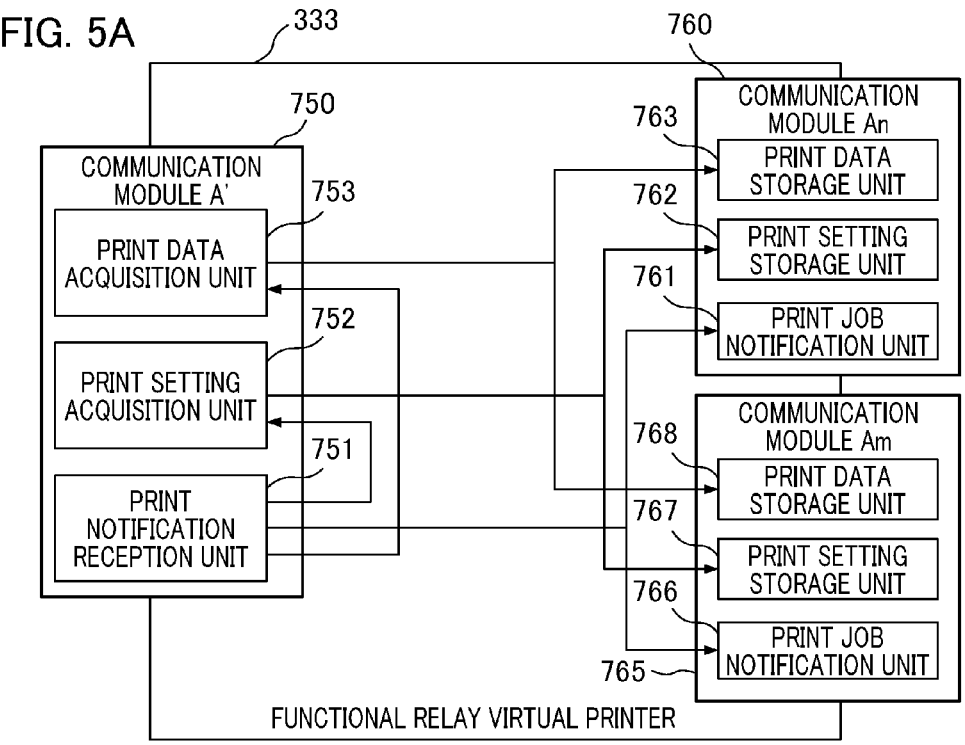
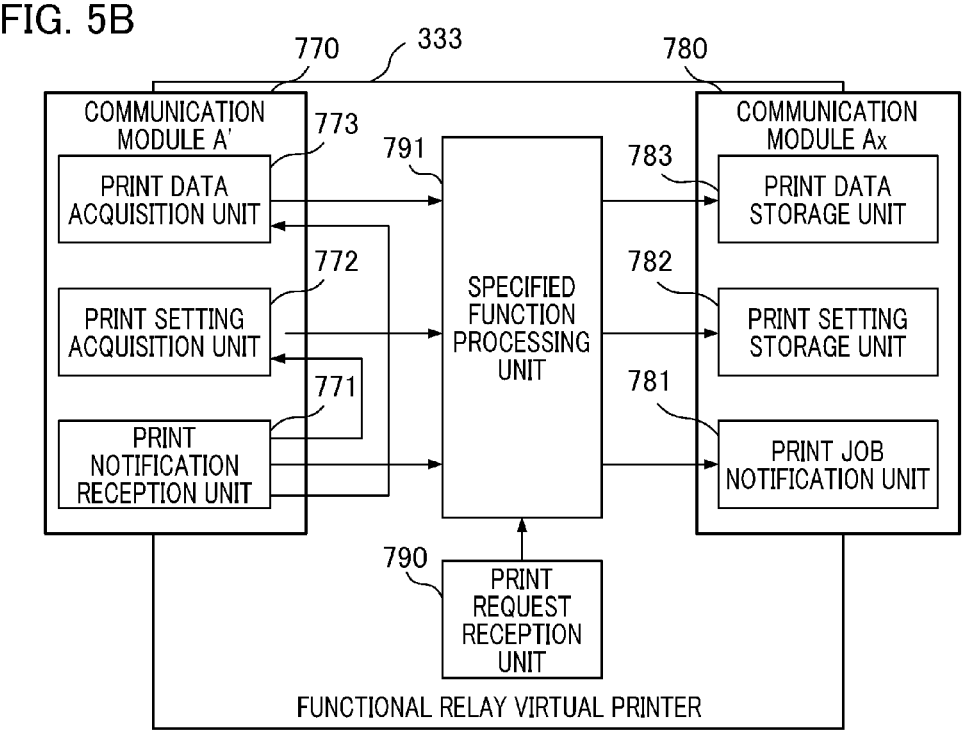

FIG. 7A

| 901 |
|---|
| Virtual Printer Service |
| Off |

FIG. 7B

| 911 | 912 | 913 | 914 | 915 | 916 | 917 |
|---|---|---|---|---|---|---|
| Virtual Printer ID | Service Name | Real Printer ID | Printer Kind | Service Printer ID | Name | Capabilities |
| VPBCH-8EA1CB19-5D9E | Print Service A | RP-E2B53416-B536 | AAA | SP-5D15DEAF-BE3C | Printer 1 | ... |
| VPBCH-94E1E881-BEFA | Print Service A | RP-E5BF5531-CAF9 | AAB | SP-2336ACD3-4D27 | Printer 2 | ... |
| VPBCH-D24B4912-2866 | Print Service A | RP-677F2761-B68D | AAC | SP-1AE5A901-3D8C | Special printing | ... |

FIG. 7C

| 921 | 922 | 923 | 924 | 925 | 926 |
|---|---|---|---|---|---|
| Service Printer ID | Name | Capabilities | Virtual Printer ID | User Name | Password |
| SP-5D15DEAF-BE3C | Printer 1 | ... | VPBCH-8EA1CB19-5D9E | User A | User A |
| SP-2336ACD3-4D27 | Printer 2 | ... | VPBCH-94E1E881-BEFA | User A | User A |
| SP-1AE5A901-3D8C | Special printing | ... | VPBCH-D24B4912-2866 | User A | User A |

FIG. 8A

Print relay service setting

Current state
Print relay service: Inactivated

[Activate] — 1001

FIG. 8B

Registration in print service

User ID: — 1010
Password: — 1011

☐ Printer 1 — 1012
☐ Printer 2 — 1013
☐ Printer 3 — 1014
☐ Activate special printing function — 1015

[Register] — 1016

FIG. 8C

Print relay service setting/Registration in print service

Current state — 1020
Print relay service: Activated

User ID — 1021
Password: — 1022

[Register in print service] — 1023

FIG. 8D

Print setting

Duplex setting: — 1030
- 1-Side Printing
- 2-Side Printing

Color setting: — 1031
- Color
- Mono

Page size: — 1032
- B5
- A4
- A3

[Execute print] — 1033

FIG. 9A
```
<Capabilities>
    <Duplex>
        <Item>1-Side</Item>
        <Item>2-Side</Item>
    </Duplex>
    <Color>
        <Item>mono</Item>
        <Item>color</Item>
    </Color>
    <PaperSize>
        <Item>B5</Item>
        <Item>A4</Item>
        <Item>A3</Item>
    </PaperSize>
</Capabilities>
```

FIG. 9B
```
<PrintSettings>
    <Duplex>
        <Item>2-Side</Item>
    </Duplex>
    <Color>
        <Item>mono</Item>
    </Color>
    <PaperSize>
        <Item>A4</Item>
    </PaperSize>
</PrintSettings>
```

FIG. 9C
```
<PrintJob>
    <id>
        <Item>5846759561318635695</Item>
    </id>
    <title>
        <Item>Doc1</Item>
    </title>
    <status>
        <Item>QUEUED</Item>              1101
    </status>
    <dataUrl>
        <Item>http://prt.srv.com/data/5846759561318635695</Item>   1102
    </dataUrl>
    <settingUrl>
        <Item>http://prt.srv.com/setting/5846759561318635695</Item>
    </settingUrl>
</PrintJob>
```

FIG. 9D
```
<PrintJob>
    <id>
        <Item>5846759561318635695</Item>
    </id>
    <title>
        <Item>Doc1</Item>
    </title>
    <status>
        <Item>QUEUED</Item>              1103
    </status>
    <dataUrl>
        <Item>http://vprinter.com/VP8CH67YXF42BBF2TQ449H8XA
              /data/5846759561318635695</Item>                     1104
    </dataUrl>
    <settingUrl>
        <Item>http://vprinter.com/VP8CH67YXF42BBF2TQ449H8XA
              /setting/5846759561318635695</Item>
    </settingUrl>
</PrintJob>
```

FIG. 17

| Registration in print service |
|---|
| User ID: _____ |
| Password: _____ |
| ☐ Printer 1 |
| ☐ Printer 2 |
| ☐ Printer 3 |
| ☐ Activate integrated printing function |
| ☐ Activate temporarily stored printing |
| [Register] |

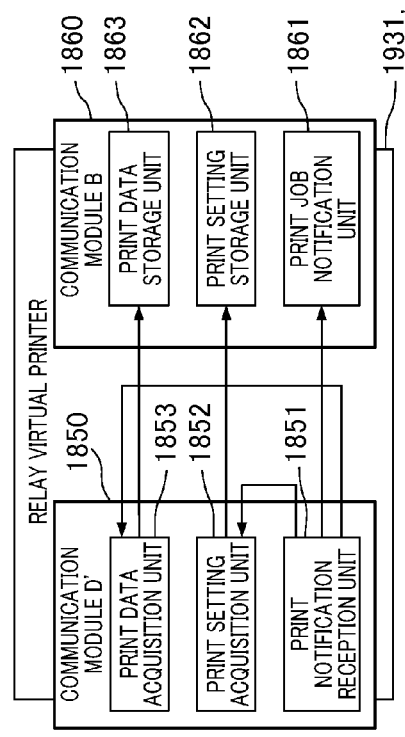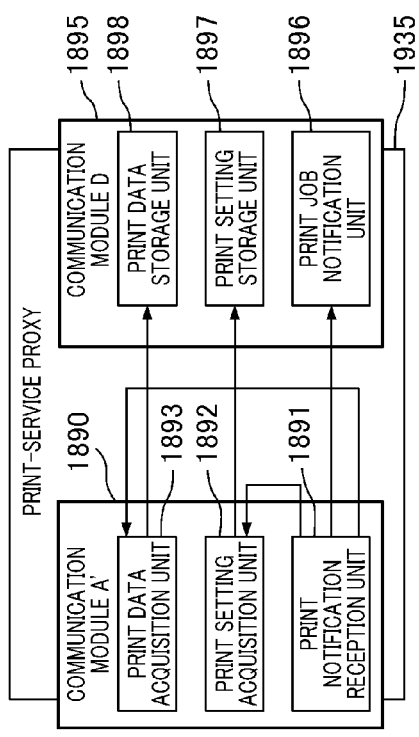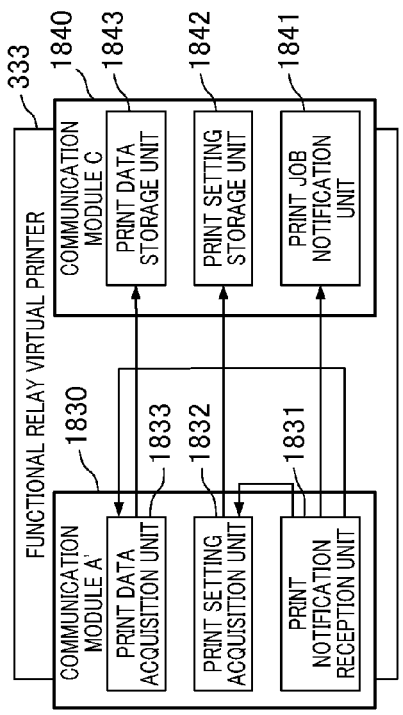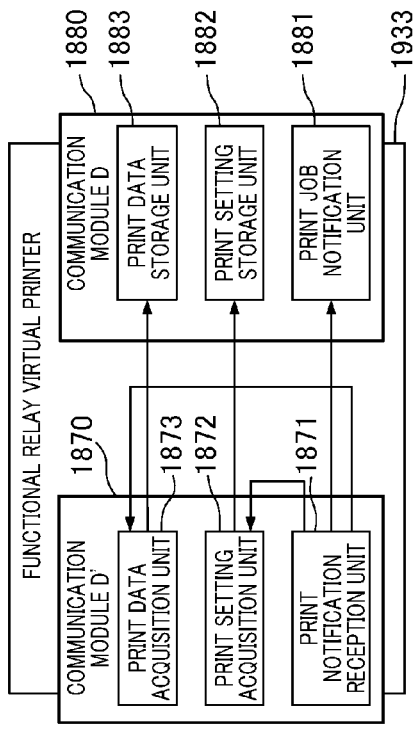

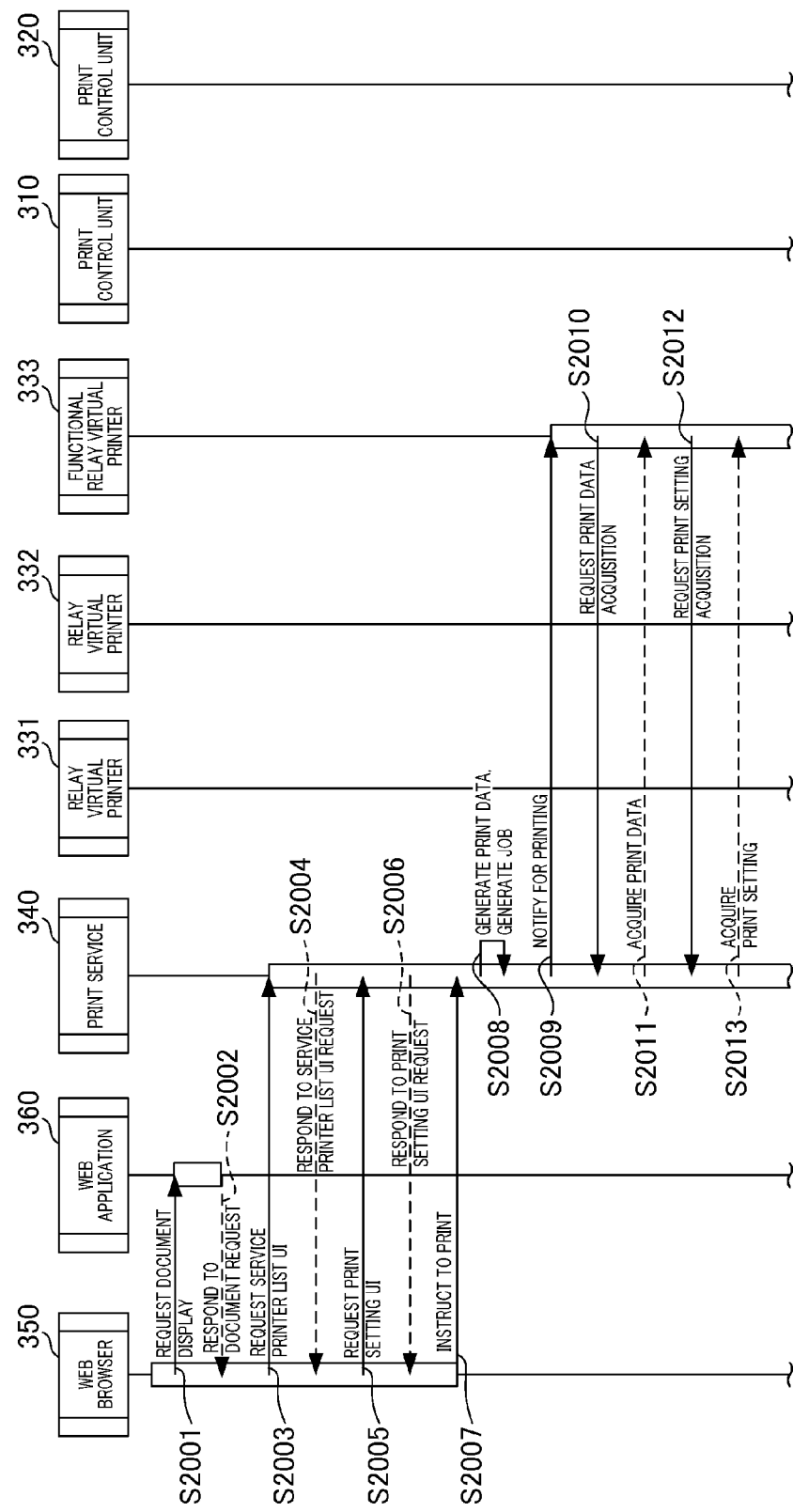

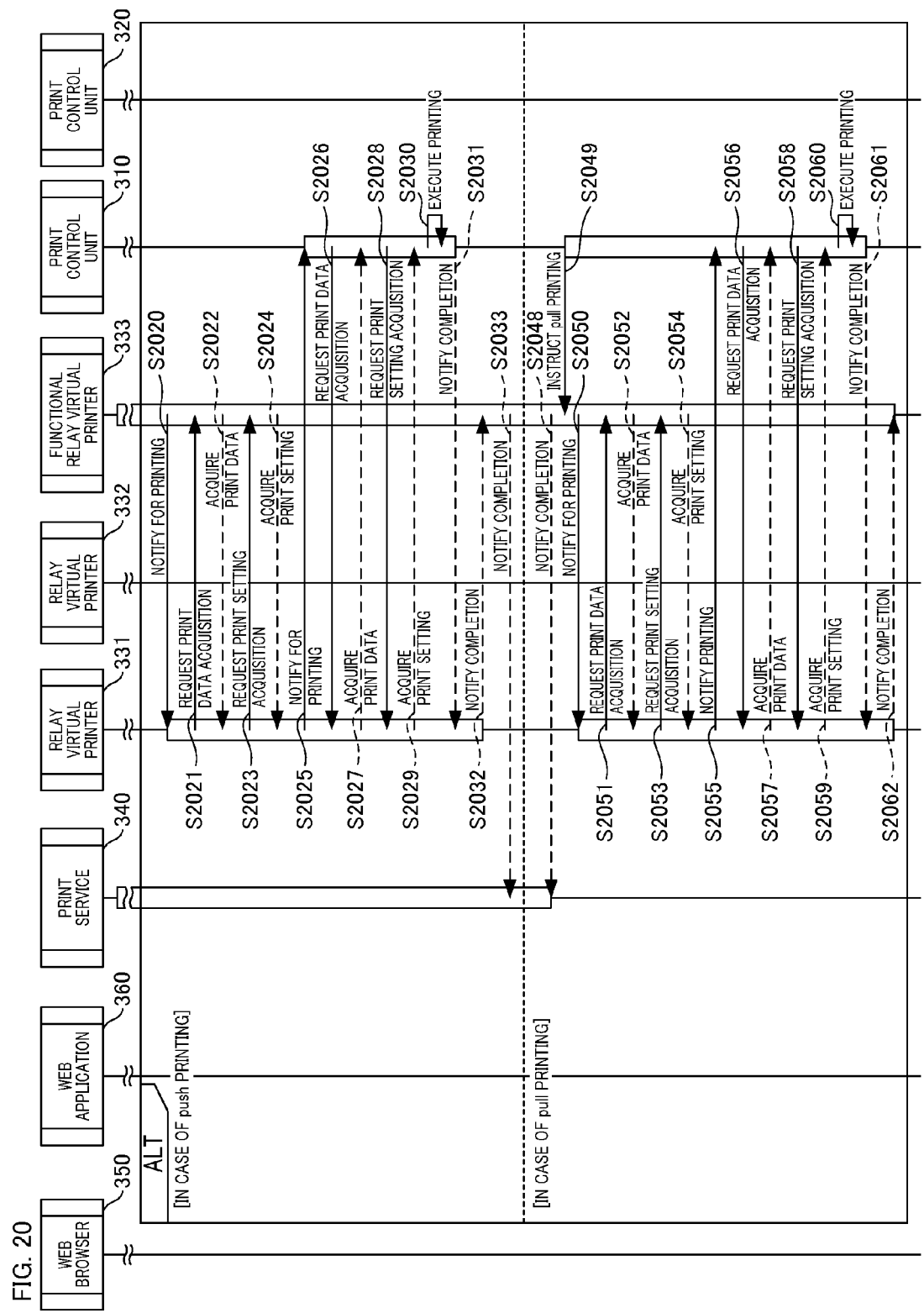

US 9,069,497 B2

INFORMATION PROCESSING APPARATUS HAVING RELAY VIRTUAL PRINTER AND FUNCTIONAL RELAY VIRTUAL PRINTER

BACKGROUND OF THE INVENTION

1. Field of the Invention

The present invention relates to an information processing apparatus, a print control method, and a storage medium.

2. Description of the Related Art

A print system in which a print instruction is transmitted from a client to a server and the server received the print instruction converts the content to be printed into print data has been proposed. In recent years, a cloud computing has been attracting attention as a system for providing service from a server to a client.

A main feature of the cloud computing is that data conversion and data processing are executed in a distributed manner using many computing resources so as to process requests from many clients in a simultaneous manner. At present, too many vendors provide various types of services by implementing Web services on a cloud computing environment for realizing the cloud computing in a disorderly way.

Among vendors who provide services on a cloud computing environment, Google (registered trademark) is a notable vendor. Google (registered trademark) not only establishes many large-scale data centers so as to propose services to be provided in cooperation with devices but also develops a data communication scheme between devices and services. Google (registered trademark) has developed a data communication scheme for providing services in cooperation with image forming devices and has disclosed an interface for providing data communication between the cloud computing environment prepared by Google (registered trademark) and image forming devices. The implementation of the interface on image forming devices enables an image forming device to be specified for printout from a client when the image forming devices and a server are connected to each other via Internet.

Japanese Patent Laid-Open No. 2005-278144 discloses a communication device that extracts credential information about a user who is the transmission source of a message from the message for requesting a call for a standard interface and verifies the justification of the user based on credential information to thereby execute a process in response to the standard interface.

It is considered that there will be increasing opportunities for device vendors to provide services in association with image forming devices in accordance with the interface disclosed by cloud computing vendors. Thus, a device vendor may wish to implement a unique function on a service to be provided in order to differentiate itself from other vendors.

Due to the characteristics of the cloud computing environment, the feature of services to be provided in the cloud computing environment lies in the fact that the services may include not only a function to be completed within a single image forming device but also a function required for working in cooperation with a plurality of image forming devices. However, when another service having a function unique to a device vendor is provided on the cloud computing environment in addition to an existing service implemented in accordance with the interface disclosed by a cloud computing vendor, the following circumstances may occur.

When a newly-added service having a function unique to a device vendor provides a unique function that is not envisaged by a cloud computing vendor, the specification for data communication in the cloud computing environment is not present for that particular function. Thus, in order to ensure that the function can be used from the existing cloud computing environment, the existing specification for data communication in the cloud computing environment needs to be changed.

For example, assume the case where a new function is added to an information processing apparatus that is arranged on a cloud computing environment, acquires print data from a print data generation device, and instructs an image forming device to print the acquired print data via a network. FIG. 21 is a diagram illustrating circumstances when a new function service is added to an information processing apparatus. A user provides a print instruction to a print data generation device. The print data generation device transmits print data corresponding to the print instruction to a VP (virtual printer) provided in the information processing apparatus and the VP instructs an RP (actual printer) corresponding to the VP to print out print data. With this arrangement, a user can receive the provision of a print service in response to a print instruction via the print data generation device and the information processing apparatus. Here, as shown in FIG. 21, it is assumed that a new function service is added to the information processing apparatus. The function service is a specified print service not provided by the print data generation device. Thus, in order for a user to be able to use the function service added to the information processing apparatus via the existing print data generation device, the existing specification for data communication between the print data generation device and the information processing apparatus must be changed.

Also, with the addition of the function service to the information processing apparatus, a communication path (a communication path shown by the dotted lines in FIG. 21) to be used when a print instruction is given from the added function service to each individual image forming device increases, resulting in an increase in communication load on each individual image forming device. When a function for realizing a specified print service not provided by the print data generation device is added to the information processing apparatus in addition to the case where a function required for working in cooperation with a plurality of image forming devices is added thereto, the aforementioned circumstances may occur.

SUMMARY OF THE INVENTION

The information processing apparatus of the present invention is an information processing apparatus that relays print data acquired from an external device to an image forming device, and, when a new function is added to the information processing apparatus, provides a service corresponding to the function without changing the specification for the existing data communication.

According to an aspect of the present invention, an information processing apparatus that acquires print data, which has been generated by a print data generation device in response to a request from a user device, from the print data generation device and relays the acquired print data to an image forming device is provided that includes a first print control unit that corresponds to the image forming device and instructs the corresponding image forming device to print out print data generated by the print data generation device; and a second print control unit that is a function in response to a print request from the user device and has a function for realizing a specified print service not provided by the print data generation device, wherein the second print control unit includes a print data acquisition unit that acquires print data from the print data generation device which has generated the print data in response to a print request from the user device; and a print instruction unit that instructs the image forming device, which executes a process for realizing a specified print service not provided by the print data generation device, to print the print data via the first print control unit.

Further features of the present invention will become apparent from the following description of exemplary embodiments with reference to the attached drawings.

BRIEF DESCRIPTION OF THE DRAWINGS

FIGS. 3A and 3B are functional block diagrams illustrating an example of a print control unit.

FIGS. 5A and 5B are functional block diagrams illustrating an example of a functional relay virtual printer.

FIG. 7A is a diagram illustrating an example of service activation/inactivation information.

FIG. 7B is a diagram illustrating an example of print service information.

FIG. 7C is a diagram illustrating an example of printer information.

FIGS. 8A to 8D are diagrams illustrating an example of a setting UI and a registration UI.

FIGS. 9A to 9D are diagrams illustrating an example of description of various information.

FIG. 17 is a diagram illustrating an example of a registration UI.

FIGS. 18A to 18E are functional block diagrams illustrating an example of a print relay server according to another embodiment.

FIG. 19 is a sequence diagram illustrating a print instruction process.

FIG. 20 is a sequence diagram illustrating a print instruction process.

DESCRIPTION OF THE EMBODIMENTS

Figure 1A:
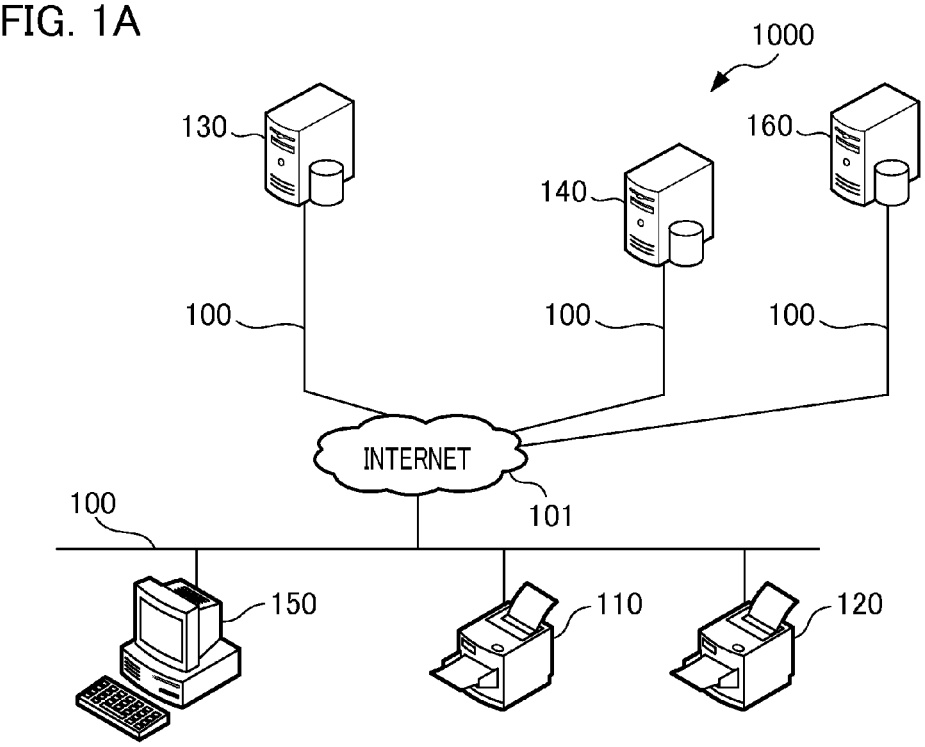
FIG. 1A is a diagram illustrating an example of a system configuration according to a first embodiment.
Figure 1B:
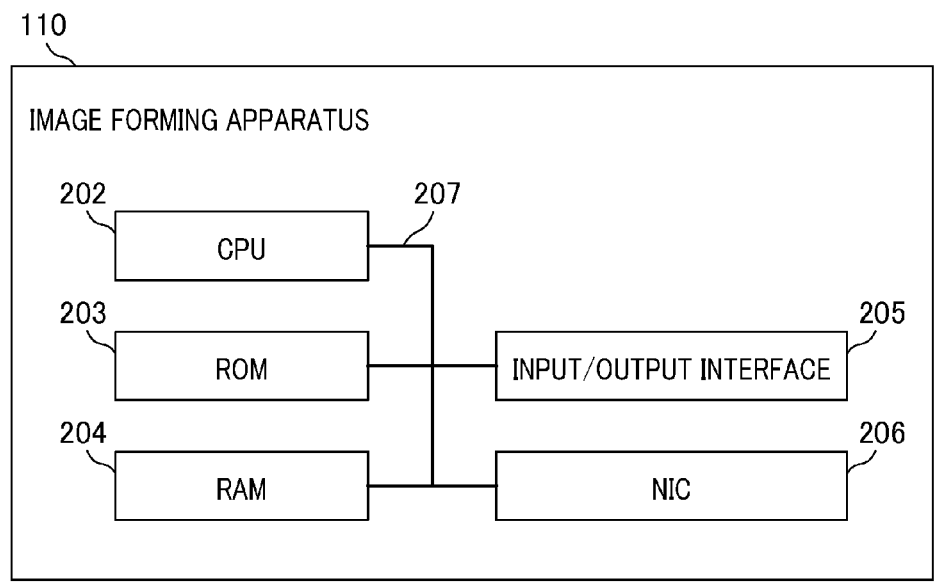
FIG. 1B is a diagram illustrating an example of the hardware configuration of an image forming device.

FIGS. 1A and 1B are diagrams illustrating an example of a system configuration according to a first embodiment of the present invention. A content printing system 1000 of the first embodiment realizes an integrated printing function. The integrated printing function is a function that instructs a plurality of image forming devices to print out print data when a one-time print request is made by a client computer 150.

The content printing system 1000 shown in FIG. 1A includes a client computer 150 and image forming devices 110 and 120. The client computer 150 and the image forming devices 110 and 120 are devices that are arranged on a user environment and are connected to each other via a network 100. The network 100 is connected to Internet 101.

The content printing system 1000 includes a Web application server 160 and a print server 140. The Web application server 160 and the print server 140 may also be servers provided by the same vendor.

The Web application server 160 and the print server 140 are connected to each other via the network 100. The Web application server 160 and the print server 140 may also be connected to each other via the Internet 101. The content printing system 1000 further includes a print relay server 130.

The print relay server 130 is an information processing apparatus that acquires print data, which has been generated by the print server 140 in response to a request from a client device serving as a user device, from the print server 140 and relays the acquired print data to an image forming device. The print relay server 130 is connected to the network 100. Units and servers constituting the content printing system 1000 are connectable to each other via the Internet 101 and can perform data communication with each other. The number of units is not necessarily the number shown in FIG. 1, but may be in plural. The print control method of the present embodiment is realized by the function of the devices provided in the system shown in FIG. 1. Also, the storage medium of the present embodiment causes a computer to execute the print control method.

FIG. 1B is a diagram illustrating an example of the hardware configuration of each unit and each server constituting a content printing system. In FIG. 1B, a description will be given by taking an example of the hardware configuration of the image forming device 110. A CPU (Central Processing Unit) 202 executes various programs and controls the overall image forming device 110.

A ROM (Read Only Memory) 203 is a unit that stores various programs. A RAM (Random Access Memory) 204 is a storage unit that functions as a temporal working storage region for the CPU 202. The CPU 202 loads a program stored in the ROM 203 into the RAM 204 to thereby execute a program. An Input/Output interface 205 transmits data to a display (not shown) connected to the image forming device 110.

Also, the Input/Output interface 205 receives data from a pointing device (not shown). An NIC (Network Interface Card) 206 connects the image forming device 110 to the network 100. The processing units shown in FIG. 1B can perform reception/transmission of data via a bus 207. Also, the image forming device 101 includes a print unit (not shown). The print unit can receive/transmit data from/to units via the bus 207. The print unit is a unit that can print a raster image on a storage medium.

Figure 2A:
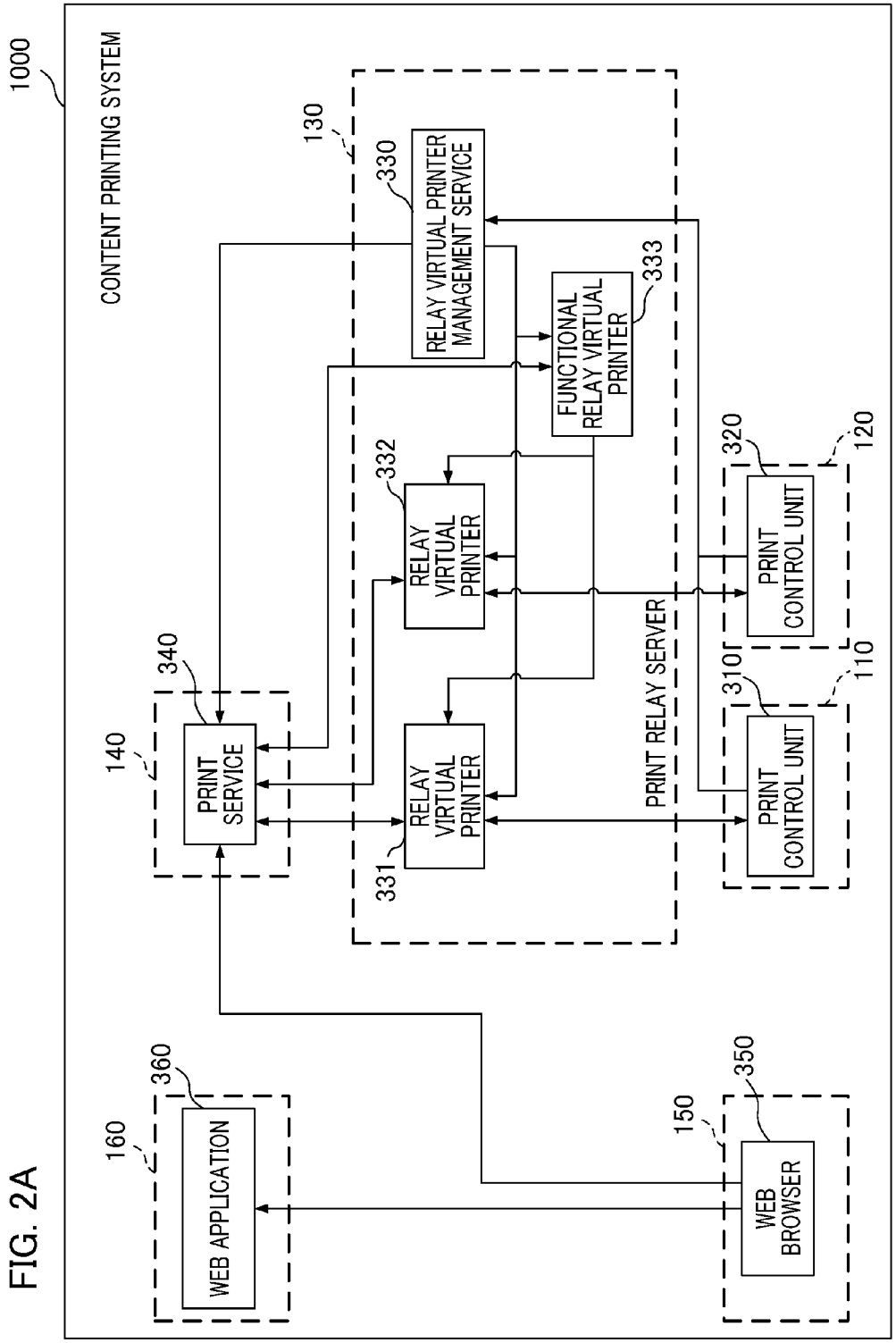
FIG. 2A is a diagram illustrating an example of the configuration of units constituting a content printing system.
Figure 2B:
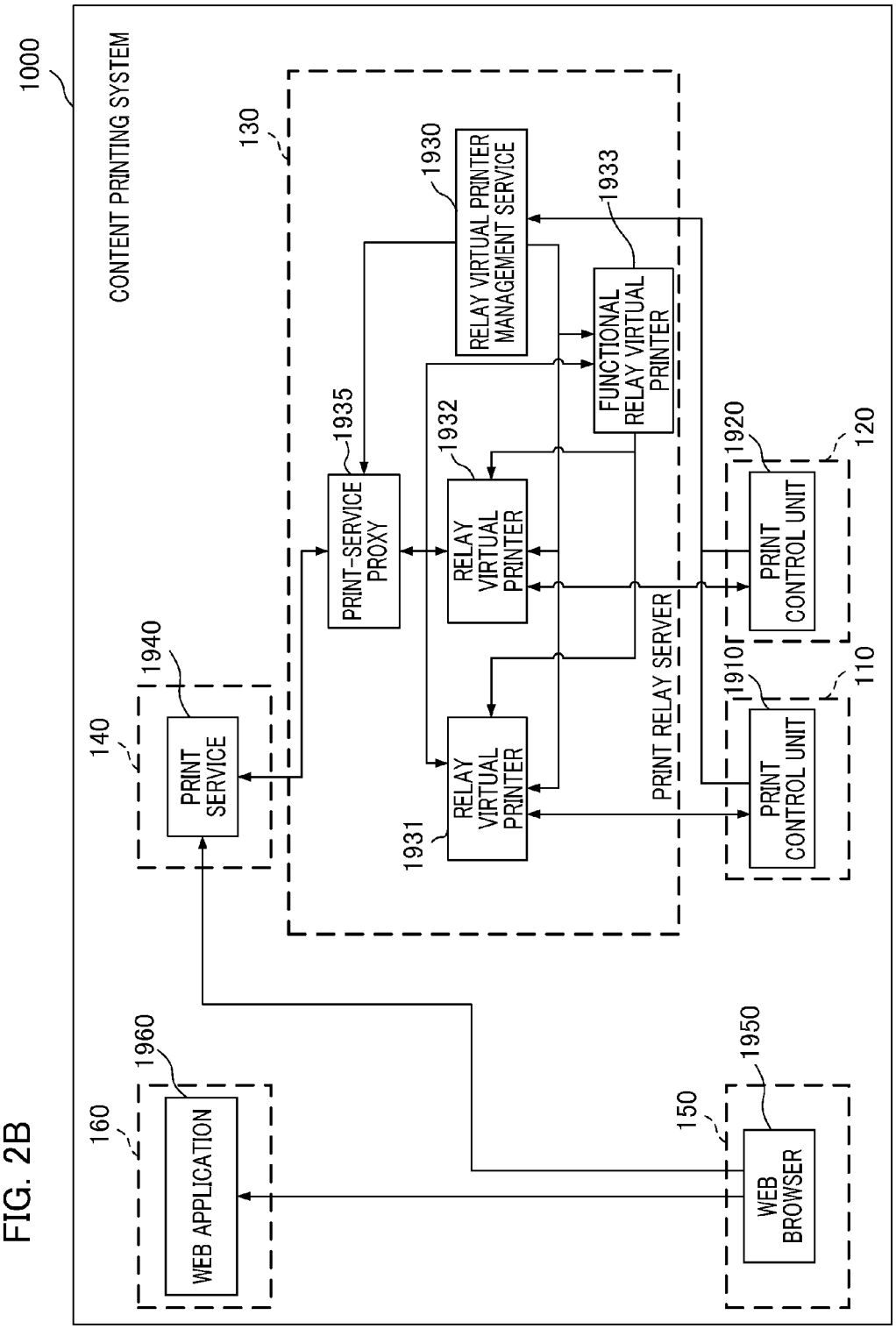
FIG. 2B is a diagram illustrating an example of the hardware configuration of each server.

FIGS. 2A and 2B are functional block diagrams illustrating an example of the configuration of units and servers constituting a content printing system. FIG. 2A is a functional block diagram illustrating the configuration of units and servers constituting the content printing system of the first embodiment. Programs for realizing the functions of units and servers shown in FIG. 2A are stored in the ROMs 203 of the units and servers. The functions are realized by the fact that the CPU 202 loads programs into the RAM 204 and executes the programs.

A description will be given of the functions provided by the units and servers. The functions to be described below are classified into the following three groups. The function classified into a first group is a function classified into a preliminary registration function in which the image forming devices 110 and 120 are registered in the print relay server 130 and relay virtual printers 331 and 332 are realized within the print relay server 130.

The function classified into a second group is a function classified into a final registration function in which a functional relay virtual printer 333 is realized within the print relay server 130 and the relay virtual printers 331 and 332 and the functional relay virtual printer 333 are registered in a print service 340. The functional relay virtual printer 333 has a function that realizes a specified print service not provided by the print server 140.

The function classified into a third group is a function classified into a print function that transmits a print instruction of the content generated by a Web application server 160 to a print server 140 and causes an image forming device to print out print data based on a print notification transmitted from the print server 140.

The print server 140 is a print data generation device that generates print data in response to a request from a client computer. Also, the print server 140 transmits a print notification to the image forming devices 110 and 120 via the print relay server 130 serving as an intermediary and causes the image forming devices 110 and 120 to print out print data. Although only two relay virtual printers 331 and 332 are shown in FIG. 2A, a plurality of relay virtual printers may be present when a plurality of image forming devices to be relayed is present. Likewise, although only one functional relay virtual printer 333 is shown in FIG. 2A, a plurality of functional relay virtual printers may be present when the content printing system 1000 has a plurality of functions.

In the first embodiment, the functional relay virtual printer 333 has an integrated printing function. In other words, when a one-time print request is made by a client computer, the functional relay virtual printer 333 instructs an image forming device to print the print data acquired from the print server 140.

Firstly, a description will be given of the function of the preliminary registration function classified into the first group. Examples of a method for registering the image forming devices 110 and 120 in the print relay server 130 include a method for registering the image forming devices 110 and 120 from the image forming devices 110 and 120 and a method for registering the image forming devices 110 and 120 in response to the input of setting information about the image forming devices 110 and 120 in the print relay server 130. There is also a method for automatically updating registration information in the print relay server 130 by performing periodical communication between the print relay server 130 and the image forming devices 110 and 120. Hereinafter, a description will be given by taking an example of a method for registering the image forming devices 110 and 120 in the print relay server 130 by the image forming devices 110 and 120.

A description will be given of the function classified into the preliminary registration function provided by the image forming devices 110 and 120. The image forming devices 110 and 120 has print control units 310 and 320, respectively.

FIGS. 3A and 3B are functional block diagrams illustrating an example of a print control unit. FIG. 3A is a functional block diagram illustrating the print control unit of the first embodiment. The configuration of the image forming device 120 and the print control unit 320 is the same as that of the image forming device 110 and the print control unit 310. Thus, in the following, description will be only given about the image forming device 110 and the print control unit 310. A display unit 401 displays various screens. A virtual printer management service information holding unit 402 has information indicating activation/inactivation of a virtual printer management service (hereinafter referred to as "service activation/inactivation information").

FIG. 7A is a diagram illustrating an example of service activation/inactivation information. The service activation/inactivation information shown in FIG. 7A indicates that a virtual printer management service is inactivated. When a process for registering the image forming device 110 in a relay virtual printer management service 330 is instructed from a user, the display unit 401 generates and displays the setting UI shown in FIG. 8A based on service activation/inactivation information. The setting UI is an UI that performs registration of the image forming device 110 on the relay virtual printer management service 330.

When the image forming device 110 is registered in the relay virtual printer management service 330, a user presses down an activation button 1001 included in the setting UI shown in FIG. 8A. A registration unit 403 issues registration information to be registered in the relay virtual printer management service 330 in response to the press-down of an activation button 1002 by the user. Next, the registration unit 403 transmits the issued registration information to be registered in the relay virtual printer management service 330 to a request reception unit 501 (see FIG. 4A) provided in the relay virtual printer management service 330.

Here, a description will be given of registration information. Registration information includes a print service name. The print service name is information for specifying a print service selected by a user. In other words, The print service name is information for specifying the print service 340 provided in the print server 140. Also, registration information includes an RPID (Real Printer ID) that is unique identification information assigned to the image forming device 110. Unique identification information is assigned to each image forming device, and thus, each image forming device is specified by unique identification information. In the present embodiment, the location for placement of each image forming device can be specified by specifying the RPID.

Also, registration information includes Printer Kind that is device kind information about the image forming device 110. The identical device kind information is assigned to the devices of the same type. When two image forming devices are the devices of the same type, it refers to the fact that two image forming devices incorporates the same communication module B'. A detailed separate description will be given below of the communication module B', a communication module A, a communication module A', and a communication module B.

Also, registration information includes the printer name of the image forming device 110. The printer name is a name assigned to the image forming device 110. Unlike identification information, the image forming devices may have the same printer name.

Also, registration information includes capabilities. Capabilities are information indicating the capability of the image forming device 110. Capabilities include, for example, information indicating whether or not the image forming device 110 can perform duplex printing, information indicating whether or not the image forming device 110 can perform color printing, and information about the size of a paper sheet which can be output.

FIG. 9A is a diagram illustrating an example of description of capabilities. Each parenthesis <Item> in the description shown in FIG. 9A indicates the capability of the image forming device 110. In this example, it is indicated that the image forming device 110 can perform imposition printing, color printing, and can output sheets of paper with the size of B5, A4, and A3.

Next, a description will be given of the function classified into the preliminary registration function provided by the print relay server 130. The print relay server 130 has the relay virtual printer management service 330.

Figure 4A:
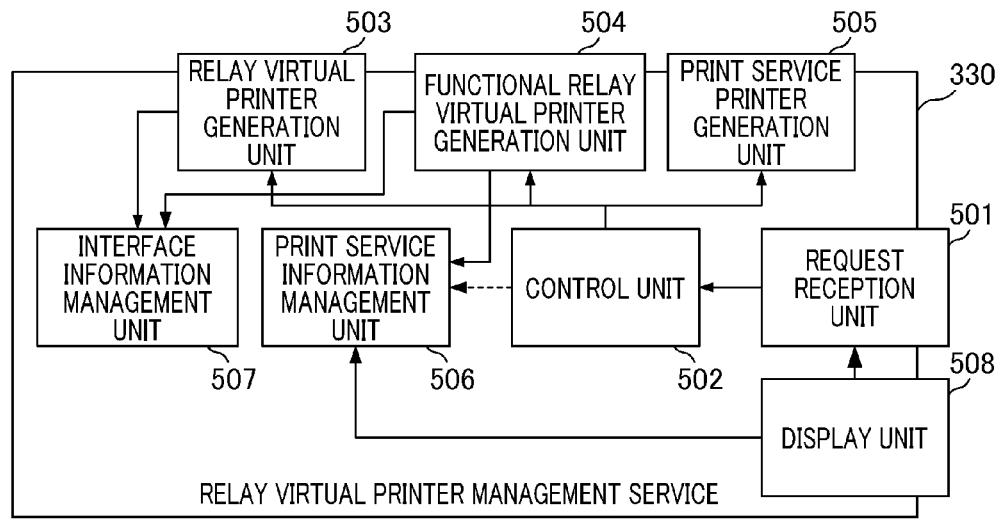
FIG. 4A is a functional block diagram illustrating an example of a relay virtual printer management service.
Figure 4B:
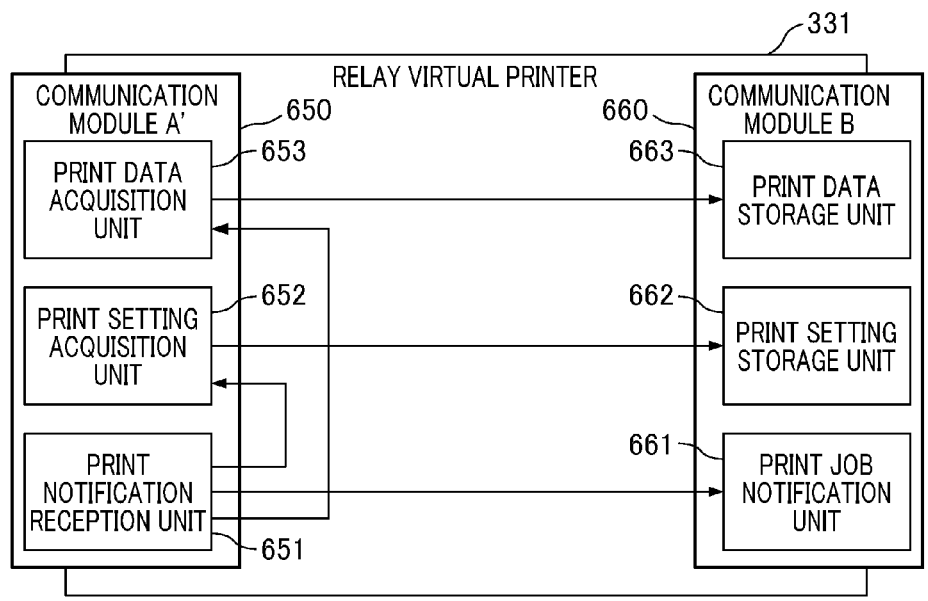
FIG. 4B is a functional block diagram illustrating an example of a relay virtual printer.

FIGS. 4A and 4B are functional block diagrams illustrating an example of a relay virtual printer management service and a relay virtual printer. FIG. 4A is a functional block diagram illustrating a relay virtual printer management service. The request reception unit 501 provided in the relay virtual printer management service 330 receives registration information to be registered in the relay virtual printer management service 330. A control unit 502 acquires and interprets registration information, which has been received by the request reception unit 501, to be registered in the relay virtual printer management service 330. Then, the control unit 502 provides instructions to the relay virtual printer generation unit 503 to perform a process for realizing the function of a relay virtual printer 331 by a relay virtual printer generation unit 503.

A description will be given of a process for realizing the function of the relay virtual printer 331 by the relay virtual printer generation unit 503. The relay virtual printer 331 has processing units shown in FIG. 4B, and the details of which will be described below.

The relay virtual printer generation unit 503 specifies and acquires a communication module B (660) stored in an interface information management unit 507 based on Printer Kind transmitted from the control unit 502. Also, the relay virtual printer generation unit 503 specifies and acquires a communication module A' (650) stored in the interface information management unit 507 based on the print service name.

The communication module B is a module that performs communication with the image forming device 110. Since the devices of the same type have the same communication module B, the devices of the same type can specify the communication module B from Printer Kind. The communication module B communicates with a communication module B' (410) provided by the print control unit 310. The communication module A' (650) is a module that performs communication with the print server 140, and is a module that can communicate with a communication module A (850) provided by the print service 340 to be described below. The communication module A (850) performs communication using a communication protocol which is open to the public to provide a print service by the print server 140. In other words, the communication module A' (650) corresponds to the communication protocol.

The relay virtual printer generation unit 503 that has acquired two or more communication modules realizes a process (thread) into which two or more communication modules have been loaded. The process corresponds to the relay virtual printer 331. The relay virtual printer 331 functions as a first print control unit that corresponds to an image forming device and instructs the corresponding image forming device to print out print data generated by the print server 140.

The relay virtual printer generation unit 503 realizes the relay virtual printer 331, and then issues a VPID (Virtual Printer ID) that is identification information for identifying the realized relay virtual printer 331. The relay virtual printer generation unit 503 transmits the issued VPID to the control unit 502. The relay virtual printer 331 is realized each time registration information is transmitted from the image forming device 110. The VPID, i.e., a unique identifier, is assigned to each of the realized relay virtual printers. In the present embodiment, the relay virtual printer 331 may be specified by specifying VPID.

Next, a description will be given of the function of a final registration function serving as a second group. Examples of a method for realizing the functional relay virtual printer 333 on the print relay server 130 and registering the relay virtual printer and the functional relay virtual printer 333 on the print service 340 include a method for providing an instruction for the registration into the print service 340 to the print relay server 130. Hereinafter, a description will be given of a process for providing an instruction for the registration into the print service 340 to the print relay server 130.

Firstly, a description will be given of the function classified into the final registration function provided by the print relay server 130. The print relay server 130 has the relay virtual printer management service 330. The relay virtual printer management service 330 includes processing units shown in FIG. 4A.

When a process for the registration of the image forming device 110 in the print service 340 and the activation of the functions provided by the functional relay virtual printer 333 is instructed from a user, a display unit 508 executes the following processing. In other words, the display unit 508 generates and displays a registration UI for a print service as shown in FIG. 8B based on registration information in a print service information management unit 506.

A user inputs the user ID and the password for the print service 340 to setting fields 1010 and 1011, respectively, on the registration UI shown in FIG. 8B. Also, a user selects an image forming device to be registered in the print service 340, and checks a check box (1012, 1013, or 1014) corresponding to the selected image forming device.

When a user wishes to activate the integrated printing function, the user checks a check box 1015 and presses down a registration button 1016. The display unit 508 transmits registration information to be registered in the print service 340 to the request reception unit 501 in response to the press-down of the registration button 1016 by the user.

A description will be given of registration information to be registered in the print service 340. Registration information includes a user ID and a password. The user ID and the password are information required for utilizing the print service 340 and the Web application server 160. The user ID and the password are referred to as "user information".

It is assumed that the Web application server 160 and the print server 140 are provided by the same vendor. Thus, when a user uses services provided by both servers, the user can receives both services using the same user information. In the present embodiment, a user has already registered user information in the Web application server 160 in advance.

The control unit 502 acquires registration information to be registered in the print service 340 received by the request reception unit 501, and interprets the acquired registration information. Then, the control unit 502 provides instructions to a functional relay virtual printer generation unit 504 and a print service printer generation unit 505 to perform the next two processes. The first process is a process for realizing the function of the functional relay virtual printer 333 by the functional relay virtual printer generation unit 504. The second process is a process for registering information about the relay virtual printer 331 and the functional relay virtual printer 333 in the print service 340 by the print service printer generation unit 505.

A description will be given of the first process, i.e., a process for realizing the function of the functional relay virtual printer 333 by the functional relay virtual printer generation unit 504. The functional relay virtual printer 333 functions as a second print control unit that provides a function in response to a print request from a client computer, namely for realizing a specified print service not provided by the print server 140.

The functional relay virtual printer 333 includes processing units shown in FIG. 5A, and the details of which will be described below. The functional relay virtual printer generation unit 504 specifies and acquires a communication module An (760) and a communication module Am (765) stored in the interface information management unit 507 based on the print service name. Also, the functional relay virtual printer generation unit 504 specifies and acquires a communication module A' (750) stored in the interface information management unit 507 based on the print service name.

The communication module An (760) is a module that performs communication with the relay virtual printer 331. The communication module Am (765) is a module that performs communication with a relay virtual printer 332. The communication module A' (750) is a module that performs communication with the print server 140, and is a module that can perform communication with the communication module A (850) provided in the print service 340 to be described below. In other words, the communication module A' (750) corresponds to a communication protocol which is open to the public to provide a print service by the print server 140.

The functional relay virtual printer generation unit 504 that has acquired two or more communication modules realizes a process (thread) into which two or more communication modules have been loaded. The process corresponds to the functional relay virtual printer 333.

The functional relay virtual printer generation unit 504 realizes the functional relay virtual printer 333, and then issues VPID (Virtual Printer ID) that is identification information for identifying the realized functional relay virtual printer 333. The VPID, i.e., a unique identifier in response to the function, is assigned to the functional relay virtual printer 333. The issued VPID is transmitted to the control unit 502. In the present embodiment, the functional relay virtual printer 333 may be specified by specifying VPID. Direct communication for providing a print instruction is not established from the functional relay virtual printer 333 to the image forming device 110.

In the present embodiment, it is assumed that the image forming devices 110 and 120 are the output destinations by means of integrated printing function. Thus, the functional relay virtual printer 333 acquires the communication module An (760) and the communication module Am (765). However, the communication module An (760) and the communication module Am (765) depend on the function of the functional relay virtual printer 333, and thus, the configuration of the functional relay virtual printer 333 should not be limited to the configuration of the present embodiment.

Next, a description will be given of the second process, i.e., a process for registering information about the relay virtual printer 331 and the functional relay virtual printer 333 in the print service 340 by the print service printer generation unit 505. In the present embodiment, the print service printer generation unit 505 functions as a registration unit that generates the functional relay virtual printer 333 and registers the generated functional relay virtual printer 333 in the print server 140. The control unit 502 transmits user information to the print service printer generation unit 505. The print service printer generation unit 505 authenticates the print server 140 based on the received user information. When the authentication is successful, the print service printer generation unit 505 transmits printer name, capabilities, and VPID to the print service 340. The print service printer generation unit 505 receives a SPID (Service Printer ID) as a response. The details of SPID will be described below.

The control unit 502 acquires VPIDs from the relay virtual printer generation unit 503 and the functional relay virtual printer generation unit 504. Also, the control unit 502 acquires SPID from the print service printer generation unit 505. The control unit 502 that has acquired both VPIDs and SPID instructs the print service information management unit 506 to store these information as part of print service information.

FIG. 7B is a diagram illustrating an example of print service information to be stored in the print service information management unit. The print service information management unit 506 associates VPIDs, SPIDs, and registration information with each other as shown in FIG. 7B, and stores them as print service information.

The reference numeral 911 corresponds to VPID, the reference numeral 912 corresponds to a print service name, the reference numeral 913 corresponds to RPID, the reference numeral 914 corresponds to Printer Kind, the reference numeral 915 corresponds to SPID, the reference numeral 916 corresponds to a printer name, and the reference numeral 917 corresponds to capabilities.

Next, a description will be given of the function classified into the final registration function provided by the print server 140. The print server 140 has the print service 340. The print server 140 virtualizes a plurality of servers as a single server, and realizes the function of the print service 340 by means of the single server. The print server 140 activates a plurality of virtual machines in the single server, and causes each virtual machine to realize the function of the print service 340. The print service 340 shown in FIG. 2A is just one of them.

Figure 6:
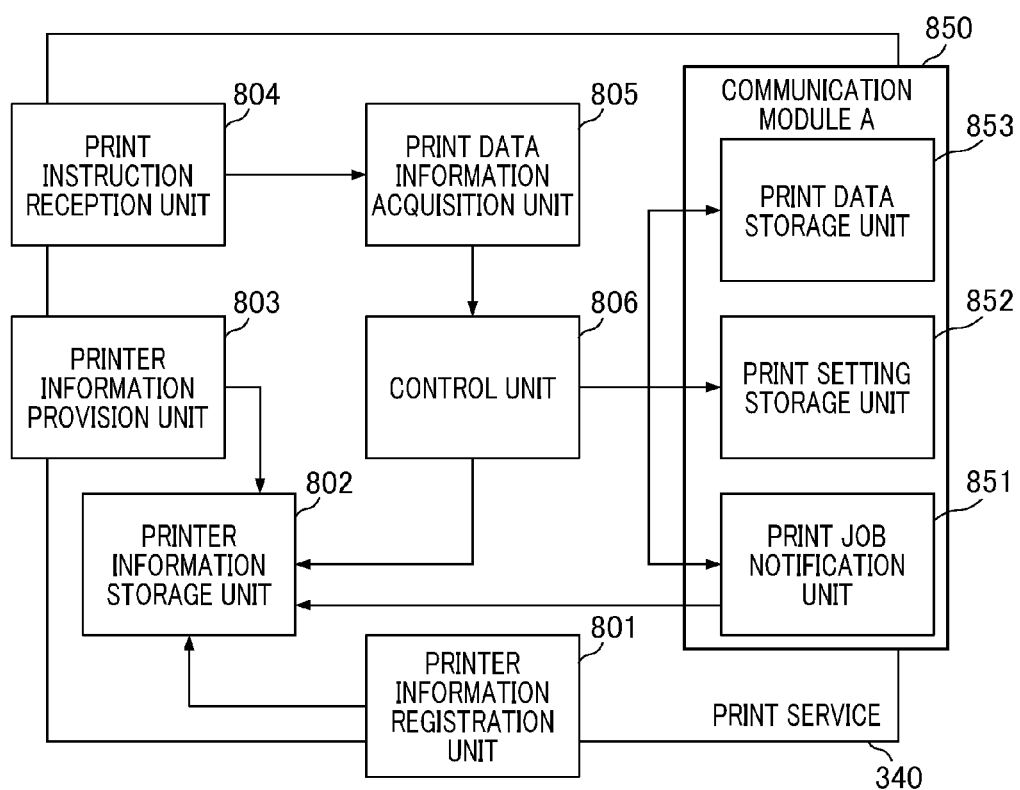
FIG. 6 is a functional block diagram illustrating an example of a print service.

FIG. 6 is a functional block diagram illustrating an example of a print service. A printer information registration unit 801 provided in the print service 340 receives user information from the print service printer generation unit 505. The printer information registration unit 801 confirms whether or not a user corresponding to user information received from the print service printer generation unit 505 is present. When the user is present, the printer information registration unit 801 determines that the authentication is successful, and receives printer name, capabilities, and VPID from the print service printer generation unit 505. Then, the printer information registration unit 801 instructs a printer information storage unit 802 to store the received VPID.

Also, the printer information registration unit 801 issues an SPID corresponding to the VPID, and transmits the issued SPID to the printer information storage unit 802 and the print service printer generation unit 505. The printer information storage unit 802 stores the printer name, the capabilities, the VPID, the SPID, the user ID, and the password that are brought into association with each other.

FIG. 7C is a diagram illustrating an example of printer information stored in a printer information storage unit. Printer information includes an SPID 921, a printer name 922, capabilities 923, a VPID 924, a user ID 925, and a password 926.

As described above, a description has been given of the function classified into the final registration function in which the functional relay virtual printer 333 is realized within the print relay server 130 and the relay virtual printers 331 and 332 and the functional relay virtual printer 333 are registered in a print service 340.

Next, a description will be given of the function classified into the print function. Firstly, a description will be given of the function provided by the client computer 150. As shown in FIG. 2A, the client computer 150 has a Web browser 350. The Web browser 350 transmits a print instruction for the content stored in the Web application server 160 to the Web application server 160.

Also, the Web browser 350 receives a command for accessing the print server 140 (i.e., a redirect instruction) from the Web application server 160, and accesses the print server 140 in accordance with the received redirect instruction. Also, the Web browser 350 acquires a list of image forming devices that are selectable by a user who is using the Web browser 350 from the accessed print server 140 and displays the list. Also, the Web browser 350 acquires a print setting screen, which corresponds to the image forming device selected from the list by the user, from the print server 140 and displays the print setting screen.

FIG. 8D shows a print setting screen (setting UI) to be displayed by a Web browser. The print setting screen corresponds to the image forming device selected by a user. Also, the Web browser 350 transmits print setting values set by a user on the print setting screen to the print server 140. The above description has been given of the Web browser 350 provided by the client computer 150.

Next, a description will be given of the function provided by the Web application server 160. As shown in FIG. 2A, the Web application server 160 has a Web application 360. The Web application server 160 virtualizes a plurality of servers as a single server, and realizes the function of the Web application 360 by means of the single server. The Web application server 160 activates a plurality of virtual machines in the single server, and causes each virtual machine to realize the function of the Web application 360.

The Web application 360 provides a document generation service. When a user wishes to distribute a material at the company's conference, the user uses the document generation service for generating the material. When the client computer 150 uses the Web application 360, there is no need to install the Web application 360 on the client computer 150 but the client computer 150 may only have the Web browser 350. The Web application 360 transmits screen information required for creating the material to the Web browser 350.

The Web application 360 performs authentication based on user information including the user ID and the password both input by a user via the Web browser 350, and sends screen information required for creating a material in response to the success of authentication. The Web browser 350 that has received the screen information displays a generation screen for generating a document based on the screen information and a user generates a material to be distributed at the conference using the generation screen. The Web application 360 receives information about the material generated by a user using the generation screen, generates content based on the received information, and causes the storage device for the Web application server 160 to store the generated content. Note that the Web application 360 provides not only a document generation service but also a mail service and a schedule service.

Figure 10:
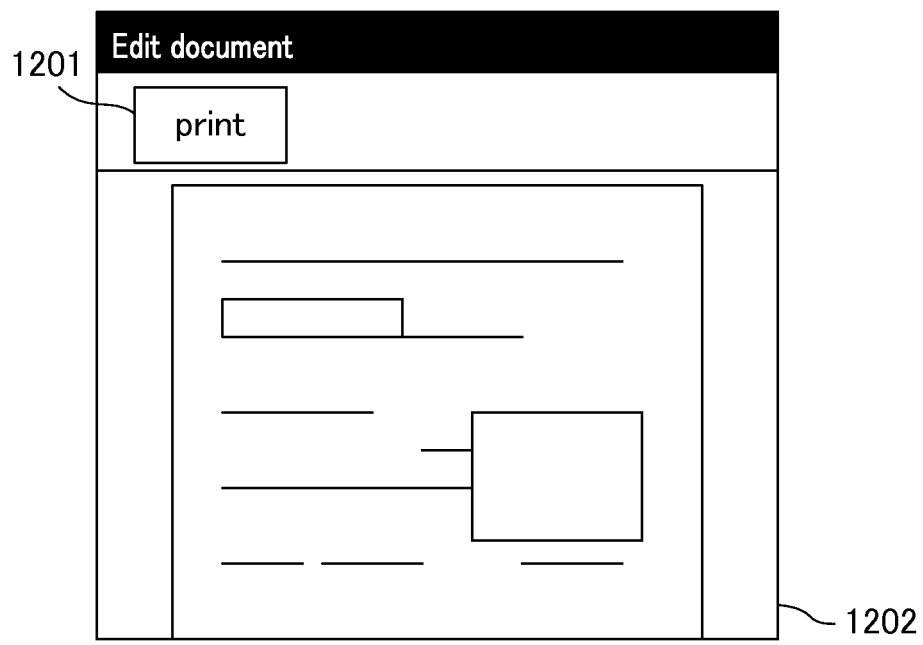
FIG. 10 is a diagram illustrating an example of a document generation service generation screen.

FIG. 10 is a diagram illustrating an example of a document generation service generation screen. A user who wishes to print a content 1202 generated by using a document generation service presses down a print button 1201 displayed on the document generation service generation screen. The Web application 360 receives information indicating that the print button 1201 has been pressed down, and transmits a command for accessing the print server 140 (i.e., a redirect instruction) to the Web browser 350.

A redirect instruction includes a request (a list acquisition request) for acquiring a list corresponding to users who are using the Web browser 350, content identification information for identifying a content to which a print instruction has been given by a user, and user information. Also, when a content acquisition request is made from the print server 140, the Web application 360 acquires the content of interest based on content identification information sent together with the content acquisition request, and transmits the acquired content to the print server 140. The above description has been given of the Web application 360 provided by the Web application server 160.

Next, a description will be given of the function classified into the print function provided by the print server 140. FIG. 6 is a functional block diagram illustrating an example of a print service provided by a print server. The print service 340 includes a printer information provision unit 803. The printer information provision unit 803 receives a list acquisition request from the Web browser 350. The printer information provision unit 803 transmits a list to the Web browser 350 in response to the reception of the list acquisition request. The printer information provision unit 803 specifies SPIDs and printer names stored in the printer information storage unit 802 based on user information. Then, the printer information provision unit 803 generates a list of image forming devices operable by a user based on the SPIDs and the printer names. Also, the printer information provision unit 803 receives the SPID of an image forming device selected from the list by the user.

The printer information provision unit 803 specifies capabilities stored in the printer information storage unit 802 based on the received SPID, generates a print setting screen, and transmits the generated print setting screen to the Web browser 350.

The printer information storage unit 802 generates, for example, the print setting screen shown in FIG. 8D based on information about capabilities shown in FIG. 9A. As shown in FIG. 8D, the printer information storage unit 802 generates a print setting screen in which only the print settings described in capabilities are selectable. A print instruction reception unit 804 receives the print settings set via the print setting screen and the SPID from the Web browser 350. Also, when the Web browser 350 accesses the print server 140 based on the redirect instruction, the print instruction reception unit 804 receives print data identification information for identifying print data to which a print instruction has been given by a user.

A print data information acquisition unit 805 receives print data identification information from the print instruction reception unit 804. Also, the print data information acquisition unit 805 receives the print settings input by a user and the SPID corresponding to the image forming device selected by the user from the print instruction reception unit 804. A control unit 806 acquires the print data identification information, the print settings, and the SPID from the print data information acquisition unit 805. The print settings are described in XML format as shown in FIG. 9B.

According to an exemplary description of the print settings shown in FIG. 9B, it can be seen that the double-sided setting, the monochrome setting, and the paper size A4 are set by a user. The communication module A (850) can communicate with a device having the communication module A' (650) and a device having the communication module A' (750). In other words, the communication module A (850) is an interface for data communication between two devices. Communication modules other than the communication module A' (650) and the communication module A' (750) cannot communicate with the communication module A (850).

Referring back to FIG. 6, the communication module A (850) includes a print job notification unit 851, a print setting storage unit 852, and a print data storage unit 853. The print data storage unit 853 receives print data identification information from the control unit 806 and stores the received print data identification information. The print setting storage unit 852 receives print settings from the control unit 806 and stores the received print settings. The print data storage unit 853 and the print setting storage unit 852 receive a storage instruction from the control unit 806 to thereby perform a storage process. The control unit 806 instructs the print job notification unit 851 to send notification information in response to the reception of an indication of the end of storage from the print data storage unit 853 and the print setting storage unit 852.

The print job notification unit 851 acquires an SPID from the control unit 806 in response to the notification information transmission instruction from the control unit 806, and specifies a VPID based on printer information stored in the printer information storage unit 802. Information about the transmission destination corresponding to the SPID, i.e., the VPID of the present embodiment, is referred to as "target". A user specifies the VPID by selecting the SPID.

Also, the print job notification unit 851 acquires the storage location of print data and the storage location of print settings from the control unit 806, generates notification information A, and transmits the notification information A to the registered image forming device. The print job notification unit 851 is a first transmission unit. Also, information to be transmitted by the print job notification unit 851 is information relating to data. In the present embodiment, the information relating to data is the notification information A. However, the information relating to data may also include other information, other data, or the like depending on the communication specification. Also in the present embodiment, the registered image forming device refers to a relay virtual printer corresponding to the VPID. Notification information is described in XML format as shown in FIG. 9C. The reference numeral 1101 indicates the description of the storage location of print data and the reference numeral 1102 indicates the description of the storage location of print settings.

Here, a description will be given of the reason why the communication modules other than the communication module A' cannot communicate with the communication module A. This is because the communication modules other than the communication module A' cannot interpret the notification information A which is transmitted by the print job notification unit 851 and is described in XML format. Another reason why communication modules other than the communication module A' cannot communicate with the communication module A is given in the following example. For example, when the communication module A does not have the print job notification unit 851 and causes the communication module A' to acquire print data and print settings in another way, the communication module A' which acquires the notification information A cannot acquire print data and print settings. This is because, since the communication module A' which acquires the notification information A is in a state of waiting for the notification information A from the communication module A, the communication module A' cannot acquire print data and print settings as long as the notification information A is not notified thereto.

The communication module A' capable of communicating with the communication module A needs to have a query function for querying the communication module A to determine whether or not data to be acquired is present. In this manner, there may also be a case where communication cannot be established between the communication module A and the communication module A' due to the fact that the communication module A' does not correspond to the data communication standard of the communication module A.

A scheme for enabling communication between the communication module A and the communication module A' is referred to as the "specification" of a vendor who provides the print server 140. Then, the specification strongly depends on the vendor who is in charge of the print server 140. The specification for data communication disclosed by the vendor who is in charge of the print server 140 is a first specification. The interface of the communication module A and the communication module A' is an interface that is generated in accordance with the first specification.

Next, a description will be given of the function classified into the print function provided by the print relay server 130. Firstly, a description will be given of the relay virtual printer 331. Since the configuration of the relay virtual printer 332 is the same as that of the relay virtual printer 331, the following description will be made regarding the relay virtual printer 331 only.

FIG. 6 is a functional block diagram illustrating a relay virtual printer. The relay virtual printer 331 includes the communication module A' (650) and the communication module B (660). A print notification reception unit 651 of the communication module A' (650) receives the notification information A transmitted from the print job notification unit 851. Since the relay virtual printer 331 is registered instead of the RPID of the image forming device 110 in the print service 340, the notification information A is transmitted to the print notification reception unit 651. Since the communication module A' is a module that is a one-to-one correspondence with the communication module A, the print notification reception unit 651 is capable of interpreting the notification information A. The print notification reception unit 651 corresponds to a first acquisition unit.

The print notification reception unit 651 confirms the storage location of print data and the storage location of print settings both described in the notification information A, and notifies these information to a print setting acquisition unit 652 and a print data acquisition unit 653. The print setting acquisition unit 652 acquires print settings from the print setting storage unit 852 based on the notified storage location of print settings. The print data acquisition unit 653 acquires print data from the print data storage unit 853 based on the notified storage location of print data.

The print data acquisition unit 653 instructs the print data storage unit 663 to store print data acquired by the print data acquisition unit 653. The print setting acquisition unit 652 instructs the print setting storage unit 662 to store the print settings acquired by the print setting acquisition unit 652. The print data storage unit 663 stores print data and notifies the storage location of print data to a print job notification unit 661. Also, the print setting storage unit 662 stores the print settings, and notifies the storage location of the print settings to the print job notification unit 661. The print job notification unit 661 generates the notification information B in response to the reception of the notification of the storage locations from the print data storage unit 663 and the print setting storage unit 662.

The notification information B is described in XML format as shown in FIG. 9D. A reference numeral 1103 indicates an exemplary description of the storage location of print data. The reference numeral 1104 indicates an exemplary description of the storage location of print settings. The print job notification unit 661 transmits the notification information B to the print control unit 310 (320) of the image forming device. The print job notification unit 661 functions as a second transmission unit. With this arrangement, a print instruction for printing print data is made to the image forming device. As described above, the communication module A' (650) passes print data and print settings to the communication module B (660) to thereby realize communication between modules.

The communication module B' corresponding to the communication module B is implemented in the image forming device 110. With this arrangement, notification information can be sent from the relay virtual printer 331 to the image forming device 110.

FIG. 5A is a functional block diagram illustrating an example of a functional relay virtual printer according to the first embodiment. The functional relay virtual printer 333 has a communication module A' 750. A print notification reception unit 751 provided in the communication module A' 750 receives the notification information A transmitted from the print job notification unit 851. Since the functional relay virtual printer 333 is registered in the print service 340, the notification information A is transmitted to the print notification reception unit 751. Since the communication module A' is a module that is a one-to-one correspondence with the communication module A, the print notification reception unit 751 is capable of interpreting the notification information A. The print notification reception unit 751 corresponds to a first acquisition unit.

The print notification reception unit 751 confirms the storage location of print data and the storage location of print settings both described in the notification information A, and notifies the storage location of print data to a print setting acquisition unit 752. Also, the print notification reception unit 751 notifies the storage location of print data to a print data acquisition unit 753. The print setting acquisition unit 752 acquires print settings from the print setting storage unit 852 based on the notified storage location of print settings. The print data acquisition unit 753 acquires print data from the print data storage unit 853 based on the notified storage location of print data. In other words, the print data acquisition unit 753 functions as a print data acquisition unit that acquires print data from the print server 140 that has generated the print data in response to a print request from a client computer.

In the present embodiment, the functional relay virtual printer 333 has an integrated printing function. The acquired print job, which has been notified via the communication module A' 750 of the functional relay virtual printer 333, is notified to the relay virtual printers 331 and 332 via a communication module An 760 and a communication module Am 765. More specifically, the print data acquisition unit 753 communicates with a transmission unit for transmitting print data (the communication module A) provided in the print server 140 to thereby acquire print data. Then, the print data acquisition unit 753 instructs print data storage units 763 and 768 to store print data acquired by the print data acquisition unit 753.

The print setting acquisition unit 752 instructs print setting storage units 762 and 767 to store the print settings acquired by the print setting acquisition unit 752. The print data storage units 763 and 768 storing print data notify the storage location of print data to print job notification units 761 and 766, respectively. The print setting storage units 762 and 767 storing the print settings notify the storage location of the print settings to the print job notification units 761 and 766, respectively.

The print job notification units 761 and 766 generate the notification information A in response to the reception of the notification of the storage locations from the print data storage units 763 and 768 and the print setting storage units 762 and 767. The storage location of print data and the storage location of print settings are described in the notification information A. The print job notification units 761 and 766 transmit the notification information A to the relay virtual printers 331 and 332, respectively. The print job notification units 761 and 766 correspond to first transmission units. Then, the print job notification units 761 and 766 communicate with a unit (the print job notification unit 661 shown in FIG. 4B) that instructs an image forming device to print out print data via the communication module A' (FIG. 4B) provided in the relay virtual printer 331. In other words, each of the print job notification units 761 and 766 is a print instruction unit that instructs an image forming device, which executes a process for realizing a specified print service not provided by the print server 140, to print out the acquired print data via a relay virtual printer.

Next, a description will be given of the function classified into the print function provided by the image forming devices 110 and 120. Since the configuration of the image forming device 120 is the same as that of the image forming device 110, the following description will be made regarding the image forming device 110 only.

As shown in FIG. 3A, the print control unit 310 has the communication module B' (410). A print notification reception unit 411 of the communication module B' (410) receives the notification information B transmitted from the print job notification unit 661. The print notification reception unit 411 corresponds to a second acquisition unit. Since the communication module B' is a module that is a one-to-one correspondence with the communication module B, the print notification reception unit 411 is capable of interpreting the notification information B. The specification defined by a device vendor in order to perform data communication between the relay virtual printer 331 and the image forming device 110 corresponds to a second specification that can be handled by the device vendor. The interface of the communication module B and the communication module B' is an interface that is generated in accordance with the second specification.

The print notification reception unit 411 confirms the storage location of print data and the storage location of print settings both described in the notification information B. The print notification reception unit 411 notifies the storage location of print settings to a print setting acquisition unit 412. Also, the print notification reception unit 411 notifies the storage location of print data to a print data acquisition unit 413. The print setting acquisition unit 412 acquires print settings from the print setting storage unit 662 based on the notified storage location of print settings.

The print data acquisition unit 413 acquires print data from the print data storage unit 663 based on the notified storage location of print data. The acquired print settings and print data are transmitted to a job management unit 407 via the print notification reception unit 411. The job management unit 407 acquires print data and print setting information and instructs a print execution unit 408 to execute printout. The instructed print execution unit 408 generates a raster image based on print settings and print data, and instructs a print unit to print the generated raster image.

The above description has been given of the function classified into the print function in which a print instruction of the content generated by the Web application server 160 is transmitted to the print server 140 and print data transmitted from the print server 140 is printed by the image forming device 110.

Next, a description will be given of a process classified into the preliminary registration function, a process classified into the final registration function, and a process classified into the print function with reference to sequence diagrams shown in FIGS. 11 to 14.

Figure 11:
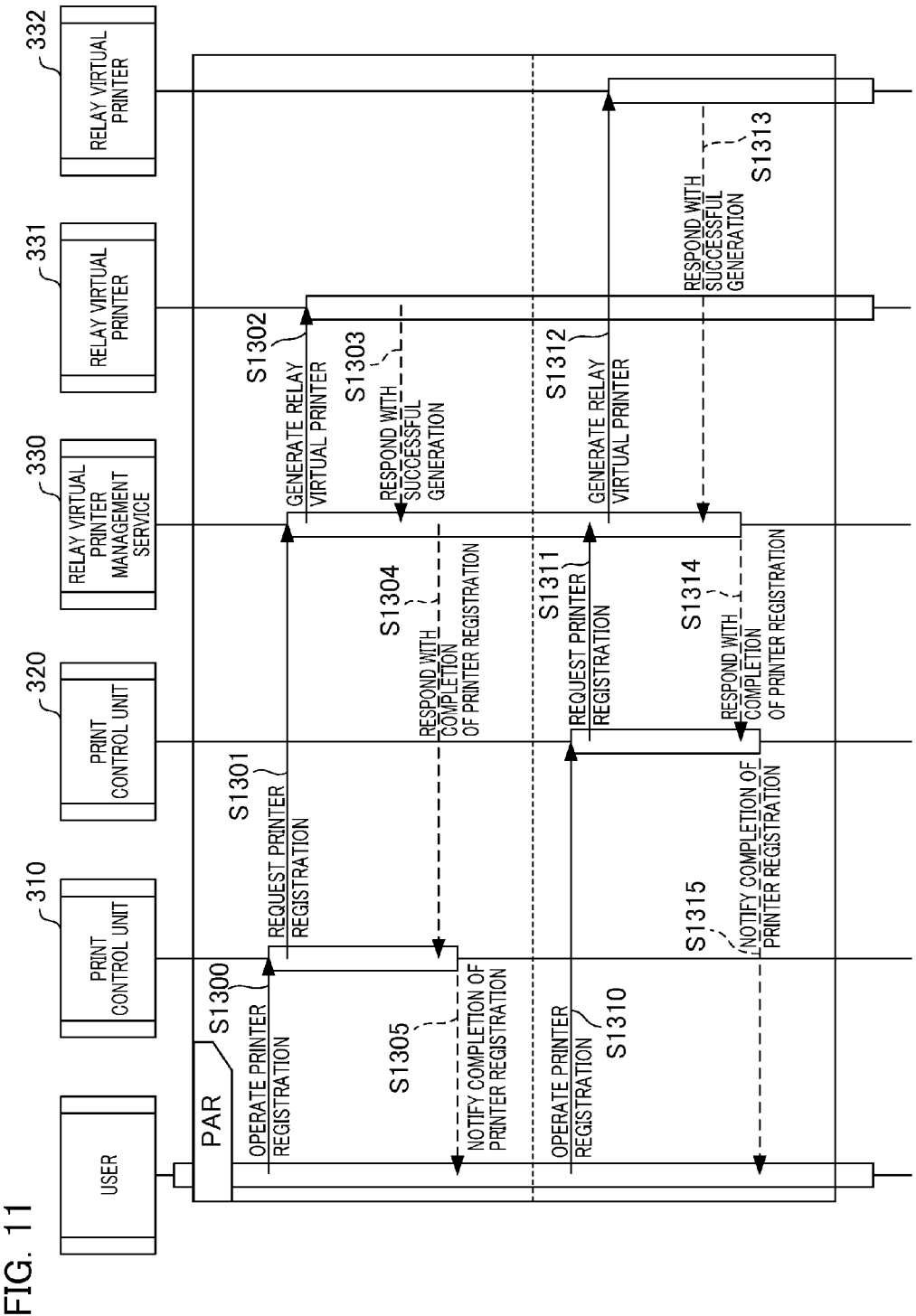
FIG. 11 is a sequence diagram illustrating a relay virtual printer generation process.

FIG. 11 is a sequence diagram illustrating an example of a relay virtual printer generation process. By means of the relay virtual printer generation process shown in FIG. 11, the image forming devices 110 and 120 are registered in the print relay server 130, and the relay virtual printers 331 and 332 are realized within the print relay server 130.

Firstly, in step S1300, a user performs a registration operation with a relay virtual printer management service from the UI of the image forming device 110. In step S1301, the print control unit 310 of the image forming device 110 requests the relay virtual printer management service 330 to register a printer. The registration information includes real printer ID, Printer Kind, Printer Name, capabilities, and Printer Service Name. In step S1302, the relay virtual printer management service 330 realizes the relay virtual printer 331 based on registration information.

In step S1303, the relay virtual printer 331 transmits a response about the successful printer generation to the relay virtual printer management service 330. In step S1304, the relay virtual printer management service 330 notifies an indication of the completion of the registration of a printer to the print control unit 310. In step S1305, the print control unit 310 instructs the UI of the image forming device 110 to display an indication of the completion of the registration of an image forming device. The processes from step S1310 to step S1315 are processes for the registration of the image forming device 120 in the print relay server 130. The processes from step S1310 to step S1315 are the same as those from step S1300 to step S1305, and thus, a description thereof is omitted. The above description has been given of a first preliminary registration process.

Figure 12:
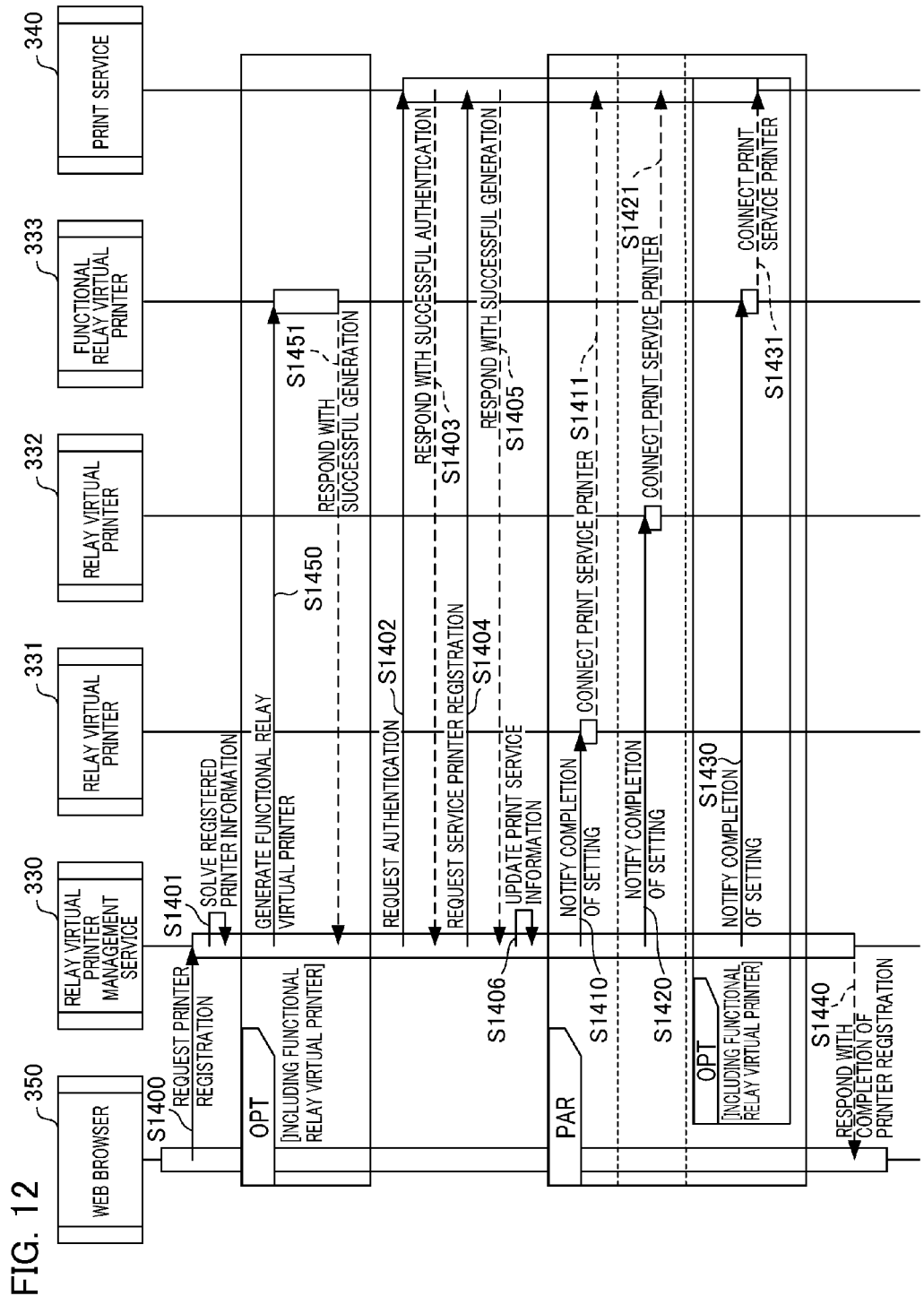
FIG. 12 is a sequence diagram illustrating a functional relay virtual printer generation/registration process.

FIG. 12 is a sequence diagram illustrating an example of a functional relay virtual printer generation/registration process. Next, as a second preliminary registration process, a description will be given of a process for the realization of the functional relay virtual printer 333 in the print service 340 and the registration of the relay virtual printers 331 and 332 and the functional relay virtual printer 333.

In step S1400, a user selects a device and its function to be registered in a print service from the UI of the relay virtual printer management service 330 via the Web browser 350 and inputs a user ID and a password to thereby request registration with the print service 340. That is, registration information includes the user ID, the password and Printer Name List. In step S1401, the relay virtual printer management service 330 determines whether or not the functional relay virtual printer 333 is included in a registration request.

When the functional relay virtual printer 333 is included in a registration request, the relay virtual printer management service 330 realizes the functional relay virtual printer 333 based on registration information in step S1450. In step S1451, the functional relay virtual printer 333 transmits a VPID to the relay virtual printer management service 330 as a response about the successful generation. In step S1402, the relay virtual printer management service 330 transmits the user ID and the password to the print service 340 to thereby request authentication. When the authentication performed by the print service 340 was successful, the print service 340 notifies the fact that authentication was successful to the relay virtual printer management service 330 in step S1503.

In step S1404, the relay virtual printer management service 330 requests the print service 340 to register the VPID as a printer (service printer) provided to the user. Registration information includes virtual printer ID, Printer Name, and capabilities. In step S1405, the print service 340 issues an SPID in response to the registration of the VPID as a service printer, and transmits the SPID to the relay virtual printer management service 330. In step S1406, the relay virtual printer management service 330 updates print service information.

In step S1410, the relay virtual printer management service 330 instructs the print service information management unit 506 to store the SPID, and notifies the fact that the settings have been completed to the relay virtual printer 331. In step S1411, the relay virtual printer 331 is connected to the communication module A of the print service 340 based on the SPID, and waits until the notification information A is transmitted.

The processes from step S1420 to step S1421 are processes corresponding to the relay virtual printer 332. The processes from step S1420 to step S1421 are the same as those from step S1410 to step S1411, and thus, a description thereof is omitted. Also, the processes from step S1430 to step S1431 are processes corresponding to the functional relay virtual printer 333. The processes from step S1430 to step S1431 are the same as those from step S1410 to step S1411, and thus, a description thereof is omitted.

In step S1440, the relay virtual printer management service 330 sends virtual printer ID and notifies the fact that the printer registration has been completed to the Web browser 350. The behavior of the functional relay virtual printer 333, which has been registered in the print service 340 by the aforementioned processes, for the print service 340 is the same as that of the relay virtual printers 331 and 332 for the print service 340. In other words, the print server 140 registers the functional relay virtual printer and the relay virtual printers as printers running on a print relay server, i.e., an information processing apparatus without knowing the functional difference therebetween. With this arrangement, a new function can be added to a print relay server without changing the specification for the existing data communication. According to the present invention, when a new function is added to the print relay server 130, the print relay server 130 can provides a service corresponding to the function without changing the specification for the existing data communication.

Figure 13:
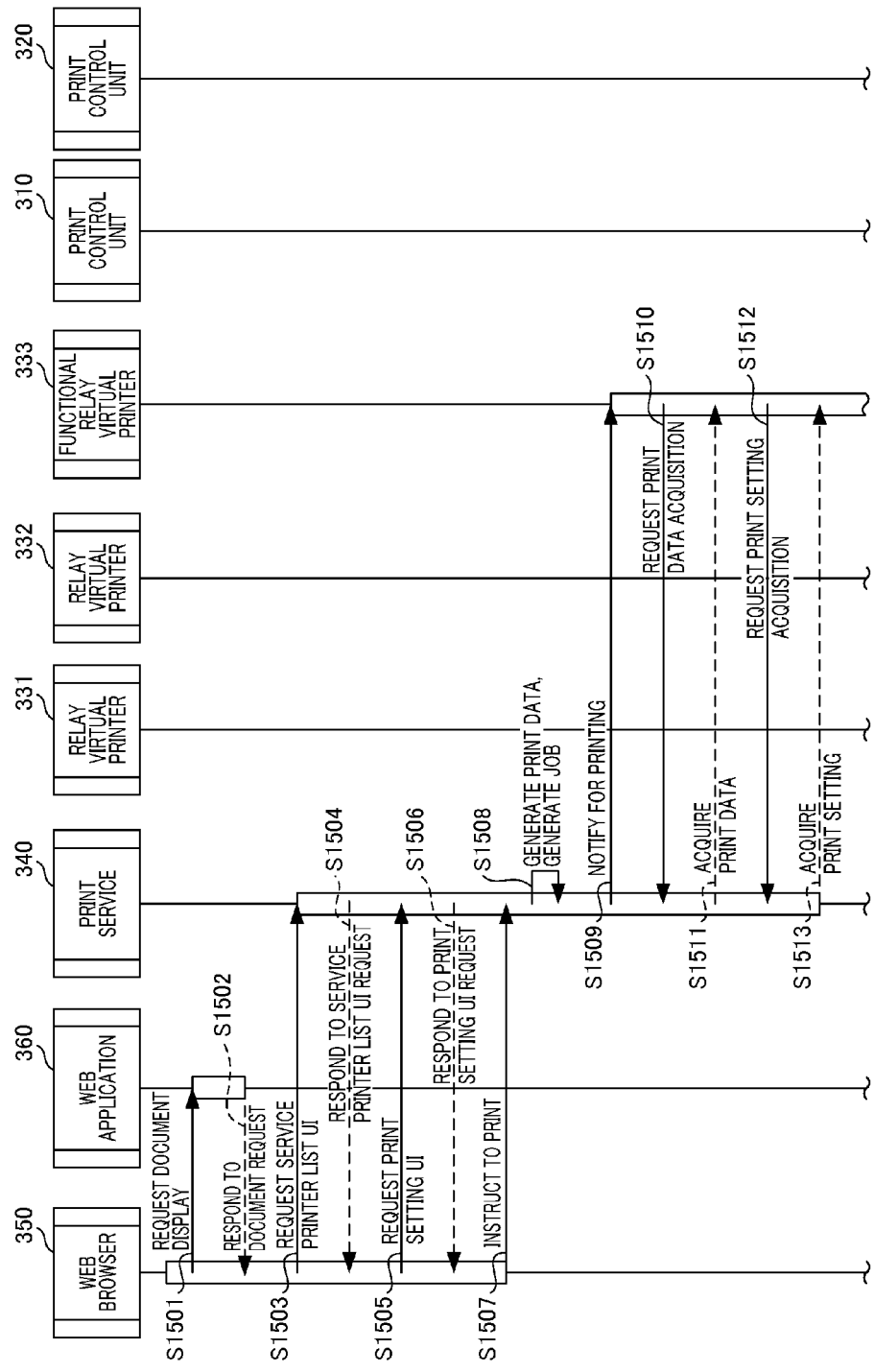
FIG. 13 is a sequence diagram illustrating a print instruction process.
Figure 14:
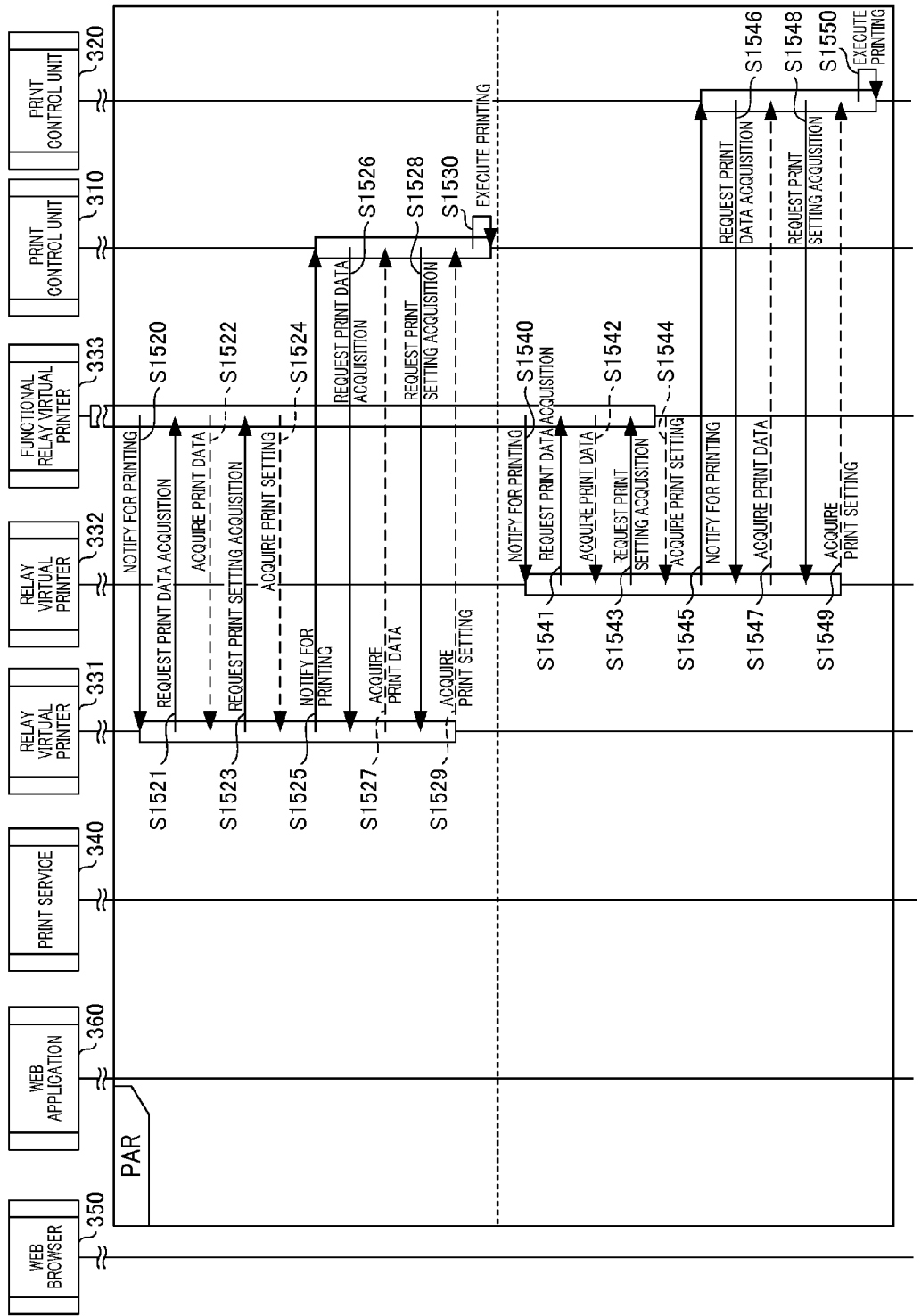
FIG. 14 is a sequence diagram illustrating a print instruction process.

FIGS. 13 and 14 are diagrams illustrating an example of processing for providing a print instruction to an image forming device. Hereinafter, a description will be given of a process for causing an image forming device to print out print data generated by the Web application server 160. In the present embodiment, the functional relay virtual printer 333 has an integrated printing function. Then, the image forming devices 110 and 120 operate in coordination to thereby execute a process corresponding to the integrated printing function.

In step S1501 shown in FIG. 13, the Web browser 350 requests the Web application 360 to display a content (document) which a user wishes to edit. In step S1502, the Web application 360 transmits the screen for content corresponding to the requested content to the Web browser 350.

In step S1503, the Web browser 350 requests a list screen of image forming devices (service printers) registered in the print service 340 in response to the print instruction given by a user via the screen for content.

In step S1504, the print service 340 transmits a list screen of corresponding service printers to the Web browser 350. In step S1505, the Web browser 350 requests a print setting screen corresponding to the selected image forming device in response to the selection of an image forming device from the list screen by a user. In step S1506, the print service 340 transmits the print setting screen to the Web browser 350. In step S1507, the Web browser 350 transmits the print settings input by a user via the print setting screen to the print service 340. The print instruction includes service printer ID, print setting, and document.

In step S1508, the print service 340 acquires identification information about print data to which a print instruction has been given by a user from the Web application 360. Also, the print service 340 generates a job by combining identification information about print data and print settings. In step S1509, the print service 340 notifies the fact that the job has been generated to the functional relay virtual printer 333. In step S1510, the functional relay virtual printer 333 sends a request to the print service 340 with print data URL to acquire print data. In step S1511, the functional relay virtual printer 333 acquires print data from the print service 340.

In step S1512, the functional relay virtual printer 333 sends a request to the print service 340 with print setting URL to acquire print settings. In step S1513, the functional relay virtual printer 333 acquires print settings from the print service 340.

Next, by means of the integrated printing function provided by the functional relay virtual printer 333, the print data and the print settings acquired by the functional relay virtual printer 333 are notified to the relay virtual printers 331 and 332, respectively. The processes from step S1520 to step S1530 shown in FIG. 14 correspond to a notification process for providing a notification to the relay virtual printer 331, and the processes from step S1540 to step S1550 correspond to a notification process for providing a notification to the relay virtual printer 332.

In step S1520 shown in FIG. 14, the functional relay virtual printer 333 notifies the fact that a job has been generated to the relay virtual printer 331. In step S1521, the relay virtual printer 331 sends a request to the functional relay virtual printer 333 with print data URL to acquire print data. In step S1522, the relay virtual printer 331 acquires print data from the functional relay virtual printer 333.

In step S1523, the relay virtual printer 331 sends a request to the functional relay virtual printer 333 with print setting URL to acquire print settings. In step S1524, the relay virtual printer 331 acquires print settings from the functional relay virtual printer 333. In step S1525, the relay virtual printer 331 notifies the fact that a job has been generated to the print control unit 310.

In step S1526, the print control unit 310 sends a request to the relay virtual printer 331 with print data URL to acquire print data. In step S1527, the print control unit 310 acquires print data from the relay virtual printer 331. In step S1528, the print control unit 310 sends a request the relay virtual printer 331 with print setting URL to acquire print settings.

In step S1529, the print control unit 310 acquires the print settings from the relay virtual printer 331. In step S1530, the print control unit 310 renders a raster image based on the acquired print settings and print data, and causes the image forming device 110 to print the raster image.

The processes from step S1540 to step S1550 are processes corresponding to the relay virtual printer 332. The processes from step S1540 to step S1550 are the same as those from step S1520 to step S1530, and thus, a description thereof is omitted. As can be seen from the description with reference to FIGS. 13 and 14, even when the function of the functional relay virtual printer 333 causes the image forming devices 110 and 120 to perform printout, a print instruction is not given from the functional relay virtual printer 333 directly to the print control units 310 and 310. With this arrangement, a new service can be added from the functional relay virtual printer 333 while suppressing an increase in communication load on each individual image forming device.

Next, a description will be given of a second embodiment. In the second embodiment, the content printing system 1000 realizes a temporarily stored printing function. The temporarily stored printing function is a function that provides a print instruction without selecting an image forming device for output at the original print instruction stage and enables the image forming device to perform printout when a print instruction is issued from an image forming device through which a user wishes to output.

The difference from the first embodiment is the configuration of the image forming devices 110 and 120, the configuration of the functional relay virtual printer 333, and a process classified into a print system. A description will be given below mainly about the difference from the first embodiment and other configurations are identical with or equivalent to those of the first embodiment.

Firstly, a description will be given of the configuration of the image forming devices 110 and 120. Since the configuration of the image forming device 120 is the same as that of the image forming device 110, the following description will be made regarding the image forming device 110 only.

FIG. 3B is a functional block diagram illustrating a print control unit according to a second embodiment. The print control unit 310 shown in FIG. 3B includes the units provided in the print control unit (see FIG. 3A) of the first embodiment and a specified function processing unit 450. When a user provides a temporarily stored printing instruction from the image forming device 110 via the display unit 401, the specified function processing unit 450 notifies the temporarily stored printing instruction to a print request reception unit 790 (FIG. 5B) of the functional relay virtual printer 333.

FIG. 5B is a functional block diagram illustrating an example of a functional relay virtual printer according to the second embodiment. The functional relay virtual printer 333 shown in FIG. 5B includes a communication module A' (770). A print notification reception unit 771 of the communication module A' (770) receives notification information A transmitted from a print job notification unit 851. Since the functional relay virtual printer 333 is registered in the print service 340, the notification information A is transmitted to the print notification reception unit 771.

Since the communication module A' is a module that is a one-to-one correspondence with the communication module A, the print notification reception unit 771 is capable of interpreting the notification information A. The print notification reception unit 771 corresponds to a first acquisition unit. The print notification reception unit 771 confirms the storage location of print data and the storage location of print settings both described in the notification information A. Then, the print notification reception unit 771 notifies the storage location of print settings to a print setting acquisition unit 772. Also, the print notification reception unit 771 notifies the storage location of print data to a print data acquisition unit 773.

The print setting acquisition unit 772 acquires print settings from the print setting storage unit 852 based on the notified storage location of print settings. Also, the print data acquisition unit 773 acquires print data from the print data storage unit 853 based on the notified storage location of print data.

The functional relay virtual printer 333 has a temporarily stored printing function. Thus, the acquired print job, which has been notified via the communication module A' (770) of the functional relay virtual printer 333, is notified to the relay virtual printers 331 and 332 via a communication module Ax (780). However, processing for the acquired print job notified via the communication module A' (770) is temporarily interrupted by a specified function processing unit 791. When the print request reception unit 790 receives the temporarily stored printing notification from the specified function processing unit 450 of the print control unit 310, the subsequent processing is executed.

The print data acquisition unit 773 instructs the print data storage unit 783 to store the print data acquired by the print data acquisition unit 773. The print setting acquisition unit 772 instructs the print setting storage unit 782 to store the print settings acquired by the print setting acquisition unit 772. The print data storage unit 783 stores the print data and notifies the storage location thereof to a print job notification unit 781. The print setting storage unit 782 stores the print settings, and notifies the storage location thereof to the print job notification unit 781.

The print job notification unit 781 generates the notification information A in response to the reception of the notification of the storage locations from the print data storage unit 783 and the print setting storage unit 782. The print job notification unit 781 transmits the notification information A to the relay virtual printers 331 and 332. The print job notification unit 781 corresponds to a first transmission unit.

Figure 15:
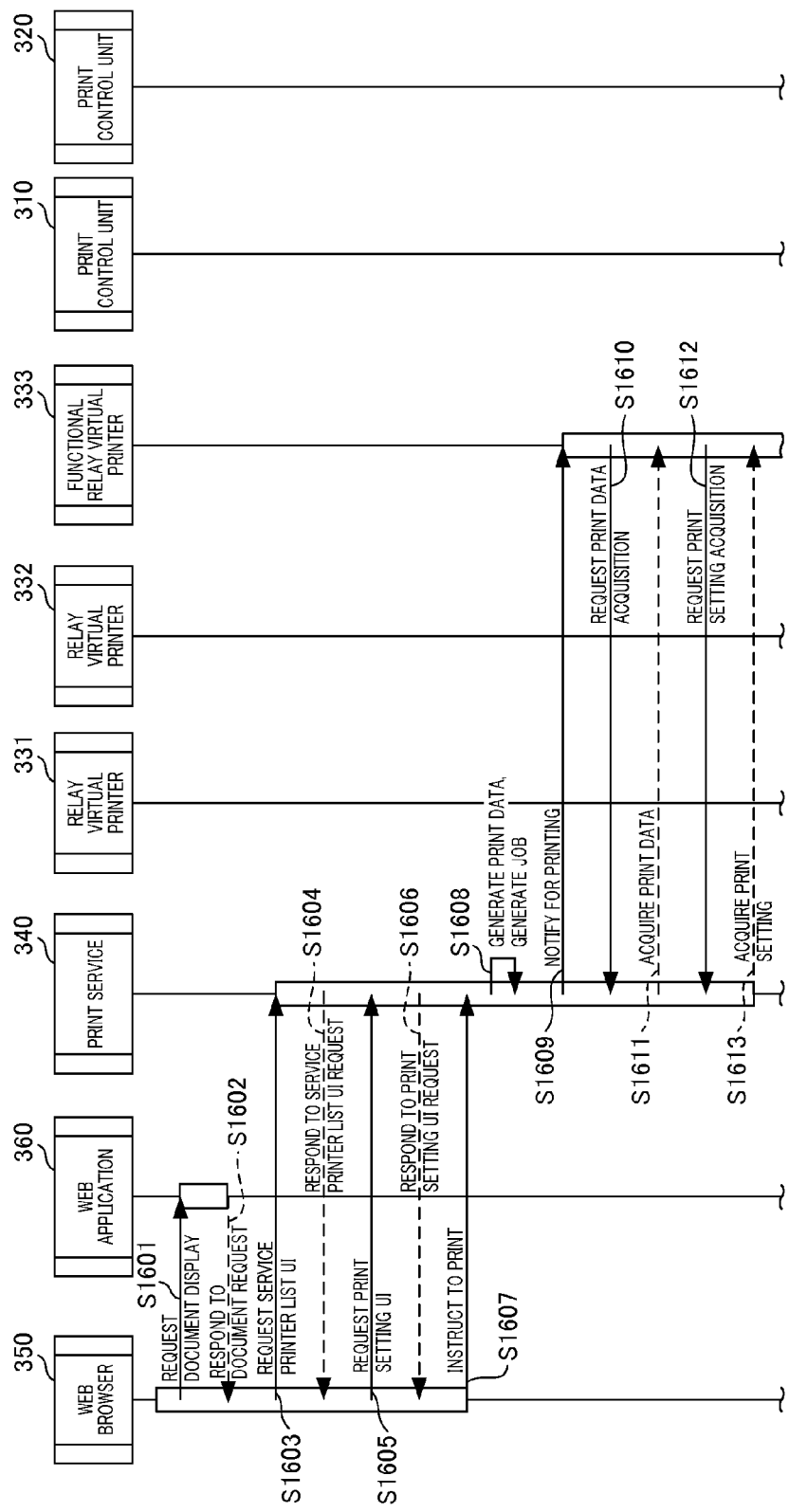
FIG. 15 is a sequence diagram illustrating a print instruction process.
Figure 16:
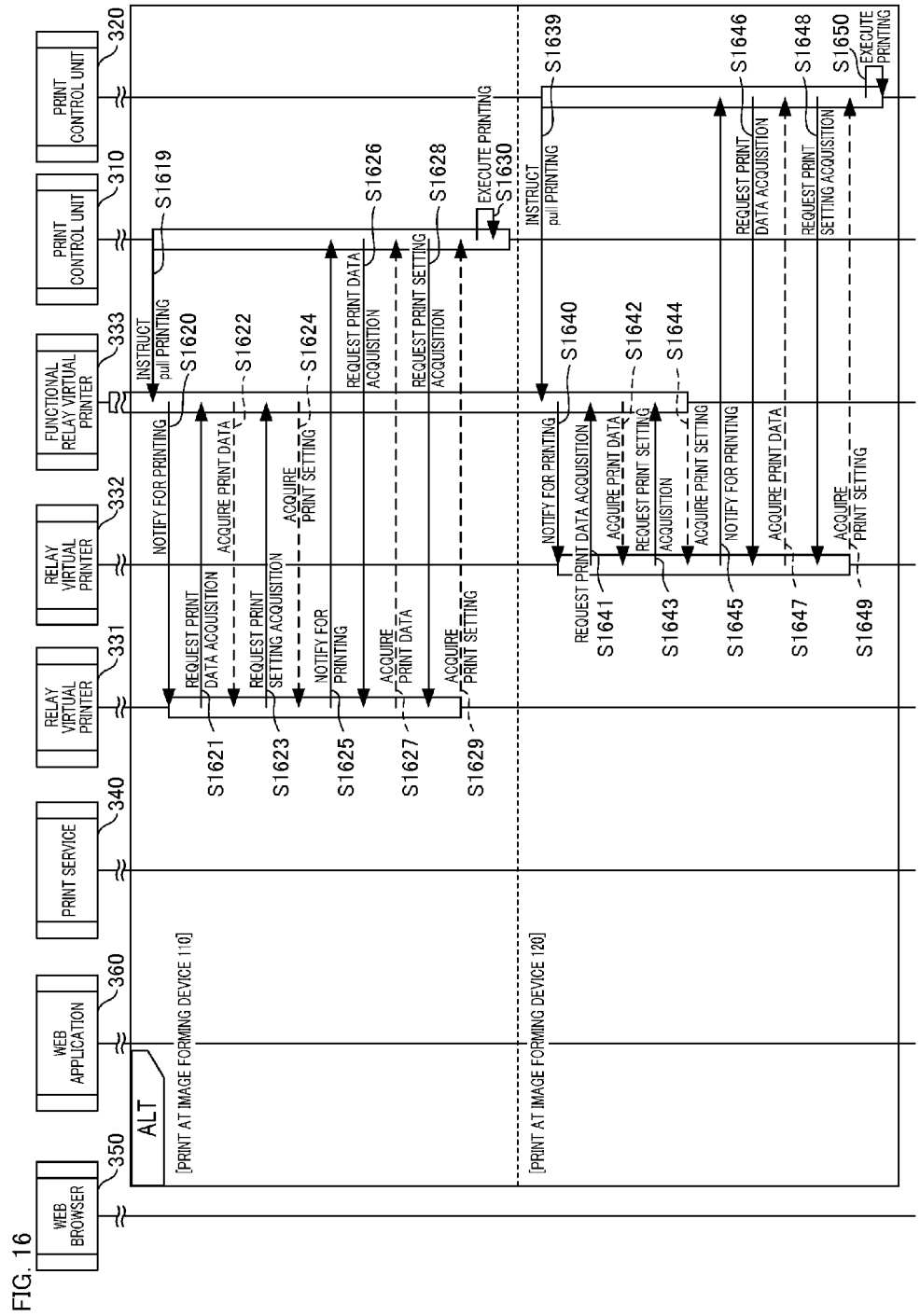
FIG. 16 is a sequence diagram illustrating a print instruction process.

FIGS. 15 and 16 are sequence diagrams illustrating an example of processing for providing a print instruction to an image forming device according to the second embodiment. In the present embodiment, the functional relay virtual printer 333 has a temporarily stored printing function. Thus, the functional relay virtual printer 333 instructs the image forming device to print out print data upon reception of a print instruction (a temporarily stored printing instruction) from the image forming device. When a print request is made by a client computer, the functional relay virtual printer 333 stores print data acquired from the print server 140, and instructs the image forming device to print out the stored print data. In the present embodiment, the image forming devices 110 and 120 are intended to provide a temporarily stored printing instruction. The processes from step S1601 to step S1613 shown in FIG. 15 are the same as those from step S1501 to step S1513 shown in FIG. 13, and thus, a description thereof is omitted.

In accordance with the temporarily stored printing function of the functional relay virtual printer 333, the print data and the print settings acquired by the functional relay virtual printer 333 are not notified to the relay virtual printers 331 and 332 until the functional relay virtual printer 333 receives a temporarily stored printing notification from the print control units 310 and 320.

Upon reception of a temporarily stored printing notification from the print control unit 310 to the functional relay virtual printer 333 in step S1619 shown in FIG. 16, the processes from step S1620 to step S1630 are executed. Also, upon reception of a temporarily stored printing notification from the print control unit 310 to the functional relay virtual printer 333 in step S1639, the processes from step S1640 to step S1650 are executed. The processes from step S1620 to step S1630 shown in FIG. 16 are the same as those from step S1520 to step S1530 shown in FIG. 14. Also, the processes from step S1640 to step S1650 shown in FIG. 16 are the same as those from step S1540 to step S1550 shown in FIG. 14.

Next, a description will be given of another embodiment of the present invention. In both the first embodiment and the second embodiment, the functional relay virtual printer 333 includes a module A that performs communication with the relay virtual printer 331 and the relay virtual printer 332. However, the configuration for enabling the functional relay virtual printer 333 to communicate with the relay virtual printers 331 and 332 may not be the same as the configuration for enabling the functional relay virtual printer 333 to communicate with the print service 340 and the relay virtual printers 331 and 332.

Figure 18A:
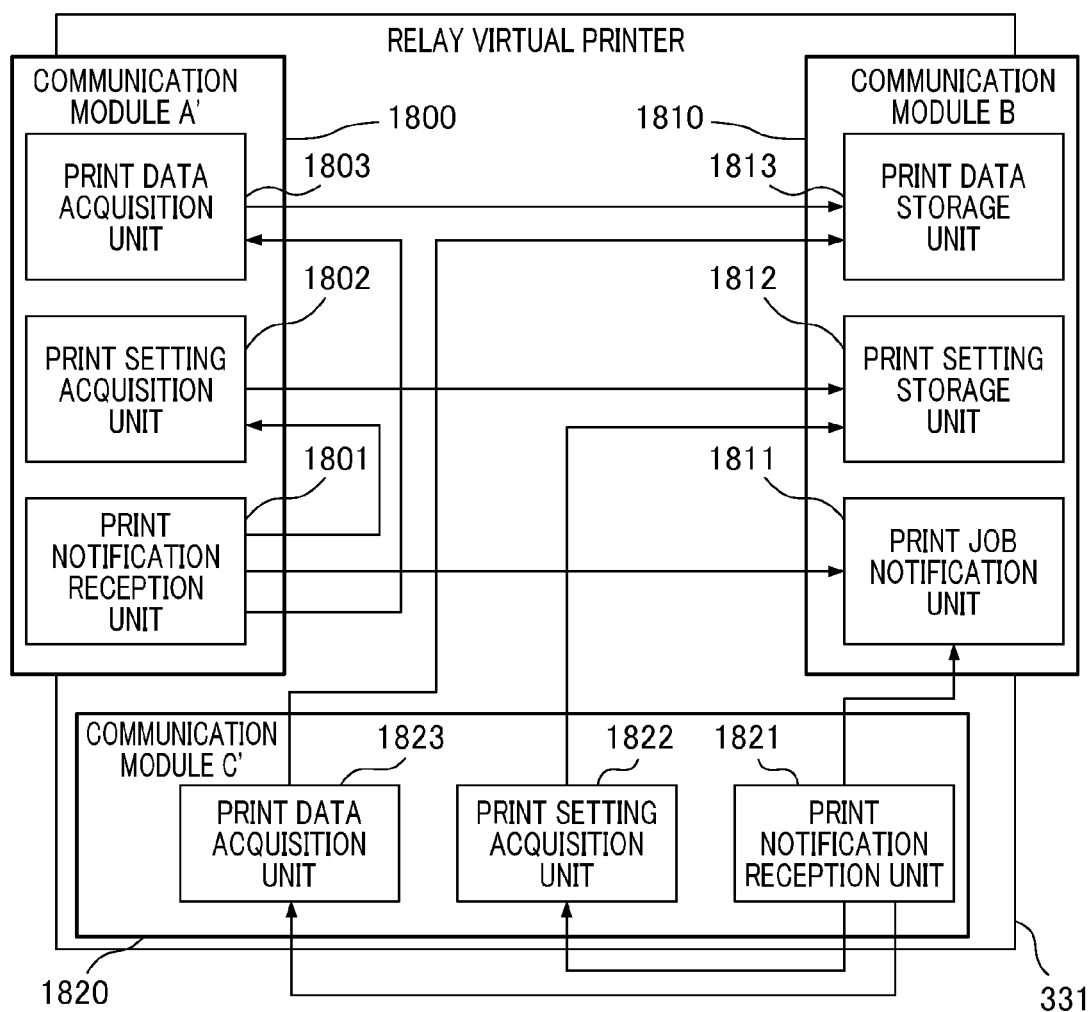
Figure 21:
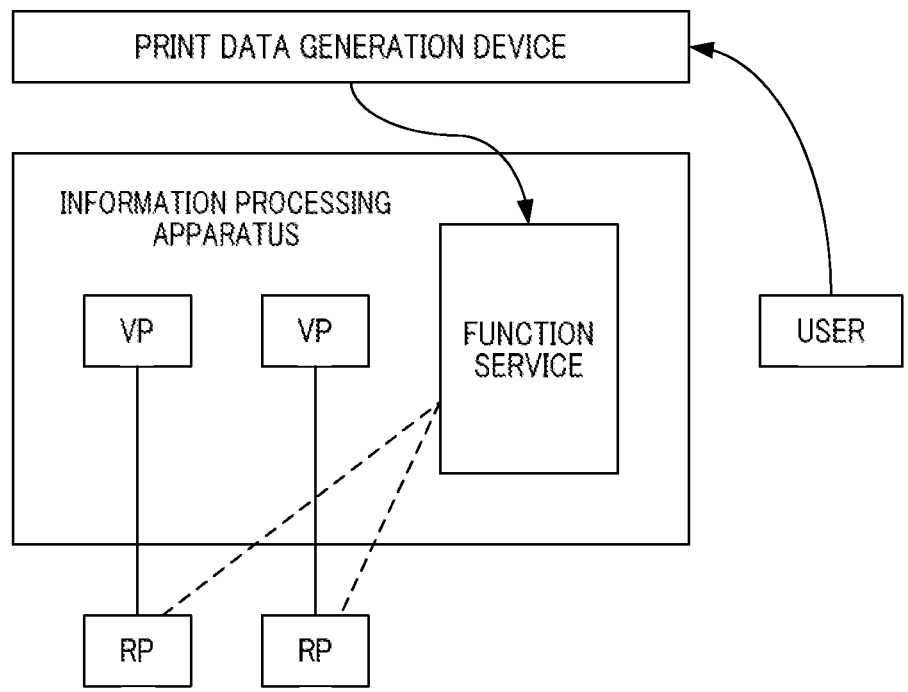
FIG. 21 is a diagram illustrating problems when a new function service is added to an information processing apparatus.

FIGS. 18A to 18E are functional block diagrams illustrating an example of a print relay server according to another embodiment. FIG. 18A is a functional block diagram illustrating a relay virtual printer. FIG. 18B is a functional block diagram illustrating a functional relay virtual printer.

As shown in FIG. 18B, the functional relay virtual printer 333 includes a communication module C that performs communication with the relay virtual printers 331 and 332. Also, as shown in FIG. 18A, the relay virtual printer 331 includes a communication module C' that performs communication with the functional relay virtual printer 333. Since the configuration of the relay virtual printer 332 is the same as that of the relay virtual printer 331, the following description will be made regarding the relay virtual printer 331 only.

As shown in FIG. 18A, the relay virtual printer 331 has a communication module A' (1800), a communication module B (1810), and a communication module C' (1820). The communication module A' (1800) is the same as the communication module A' (650) shown in FIG. 4B. Also, the communication module B (1810) is the same as the communication module B (660) shown in FIG. 4B.

A print notification reception unit 1821 provided in the communication module C' (1820) receives notification information C transmitted from a print job notification unit 1841. The notification information C includes the storage location of print data and the storage location of print settings. Since the communication module C' is a module that is a one-to-one correspondence with the communication module C, the print notification reception unit 1821 is capable of interpreting the notification information C. The print notification reception unit 1821 is an acquisition unit based on a specification different from the specification defined by the first acquisition unit.

The print notification reception unit 1821 confirms the storage location of print data and the storage location of print settings both described in the notification information C, and notifies these information to a print setting acquisition unit 1822 and a print data acquisition unit 1823. The print setting acquisition unit 1822 acquires print settings from a print setting storage unit 1842 based on the notified storage location of print settings. The print data acquisition unit 1823 acquires print data from a print data storage unit 1843 based on the notified storage location of print data.

The print data acquisition unit 1823 instructs a print data storage unit 1813 to store the print data acquired by the print data acquisition unit 1823. The print setting acquisition unit 1822 instructs a print setting storage unit 1812 to store the print settings acquired by the print setting acquisition unit 1822.

The print data storage unit 1813 stores the print data and notifies the storage location thereof to a print job notification unit 1811. The print setting storage unit 1812 stores the print settings and notifies the storage location thereof to the print job notification unit 1811. The print job notification unit 1811 generates notification information B in response to the reception of the notification of the storage locations from the print data storage unit 1813 and the print setting storage unit 1812.

FIG. 18B only shows the configuration relating to communication between the functional relay virtual printer 333 and the relay virtual printer 331. The acquired print job, which has been notified via a communication module A' (1830) of the functional relay virtual printer 333, is notified to the relay virtual printer 331 via a communication module C (1840). A print data acquisition unit 1833 instructs the print data storage unit 1843 to store the print data acquired by the print data acquisition unit 1833. A print setting acquisition unit 1832 instructs the print setting storage unit 1842 to store the print settings acquired by the print setting acquisition unit 1832.

The print data storage unit 1843 stores the print data and notifies the storage location thereof to the print job notification unit 1841. The print setting storage unit 1842 stores the print settings and notifies the storage location thereof to the print job notification unit 1841. The print job notification unit 1841 generates notification information C in response to the reception of the notification of the storage locations from the print data storage unit 1843 and the print setting storage unit 1842. The print job notification unit 1841 transmits the notification information C to the relay virtual printer 331. The print job notification unit 1841 is a transmission unit based on a specification different from the specification defined by the first acquisition unit.

In the aforementioned first and second embodiments, the relay virtual printer 331 includes the communication module A' that performs communication with the print service 340 and the communication module B that performs communication with the print control unit 310. In another embodiment, the communication module A' that performs communication with the print service 340 may be separated from the relay virtual printer 331. Then, the print relay server 130 may include a print-service proxy 1935 (see FIG. 18E), and the print-service proxy 1935 may include the communication module A' that performs communication with the print service 340.

FIG. 2B is a diagram illustrating the configuration of a content printing system according to another embodiment. A functional relay virtual printer 1933 provided in the content printing system shown in FIG. 2B has the configuration shown in FIG. 18D. Each of relay virtual printers 1931 and 1932 provided in the content printing system has the configuration shown in FIG. 18C. Also, a print-service proxy 1935 provided in the content printing system has the configuration shown in FIG. 18E. Other configurations are identical with or equivalent to those of the first embodiment and the second embodiment. In other words, a Web application 1960, a Web browser 1950, and a print service 1940 are the same as the Web application 360, the Web browser 350, and the print service 340 shown in FIG. 2A, respectively. Also, a print control unit 1910, a print control unit 1920, and a relay virtual printer management service 1930 are the same as the print control unit 310, the print control unit 320, and the relay virtual printer management service 330 shown in FIG. 2A, respectively.

The configuration for enabling the functional relay virtual printer 1933 shown in FIG. 2B to communicate with the relay virtual printers 1931 and 1932 is a communication module D'. The configuration for enabling the relay virtual printers 1931 and 1932 to communicate with the functional relay virtual printer 1933 is a communication module D.

As shown in FIG. 18C, the relay virtual printer 1931 includes a communication module D' (1850) and a communication module B (1860). A print notification reception unit 1851 provided in the communication module D' (1850) receives notification information D transmitted from a print job notification unit 1896. The communication module D' is a module that is a one-to-one correspondence with the communication module D. Thus, the print notification reception unit 1851 is capable of interpreting the notification information D. The print notification reception unit 1851 is an acquisition unit based on a specification different from the specification defined by the first acquisition unit.

The print notification reception unit 1851 confirms the storage location of print data and the storage location of print settings both described in the notification information D. Then, the print notification reception unit 1851 notifies the storage location of print settings to a print setting acquisition unit 1852. Also, the print notification reception unit 1851 notifies the storage location of print data to a print data acquisition unit 1853. The print setting acquisition unit 1852 acquires print settings from a print setting storage unit 1897 based on the notified storage location of print settings. The print data acquisition unit 1853 acquires print data from a print data storage unit 1898 based on the notified storage location of print data.

The print data acquisition unit 1853 instructs a print data storage unit 1863 to store the print data acquired by the print data acquisition unit 1853. Also, the print setting acquisition unit 1852 instructs a print setting storage unit 1862 to store the print settings acquired by the print setting acquisition unit 1852.

The print data storage unit 1863 stores the print data and notifies the storage location thereof to a print job notification unit 1861. The print setting storage unit 1862 stores the print settings and notifies the storage location thereof to the print job notification unit 1861. The print job notification unit 1861 generates the notification information B in response to the reception of the notification of the storage locations from the print data storage unit 1863 and the print setting storage unit 1862.

As in the first and second embodiments, the functional relay virtual printer 1933 has a function for realizing a specified print service not provided by the print server 140. However, for the purpose of describing communication between the functional relay virtual printer 1933 and the relay virtual printer 1931, the configuration relating to the function is omitted in FIG. 18D.

The acquired print job, which has been notified via the communication module D' (1970) of the functional relay virtual printer (1933), is notified to the relay virtual printer 1931 via a communication module D (1880). A print data acquisition unit 1873 instructs a print data storage unit 1883 to store the print data acquired by the print data acquisition unit 1873. A print setting acquisition unit 1872 instructs a print setting storage unit 1882 to store the print settings acquired by the print setting acquisition unit 1872.

The print data storage unit 1883 stores the print data and notifies the storage location thereof to a print job notification unit 1881. The print setting storage unit 1882 stores the print settings and notifies the storage location thereof to the print job notification unit 1881. The print job notification unit 1881 generates the notification information D in response to the reception of the notification of the storage locations from the print data storage unit 1883 and the print setting storage unit 1882. The print job notification unit 1881 transmits the notification information D to the relay virtual printer 1931. The print job notification unit 1881 is a transmission unit based on a specification different from the specification defined by the first acquisition unit.

As shown in FIG. 18E, the print-service proxy 1935 has a communication module A' (1890) and a communication module D (1895). The communication module A' (1890) is the same as the communication module A' (650) in the first and second embodiments.

The acquired print job, which has been notified via the communication module A' (1890) of the print-service proxy 1935, is notified to the relay virtual printer 1931 to the functional relay virtual printer 1933 via the communication module D (1895).

A print data acquisition unit 1893 instructs the print data storage unit 1898 to store the print data acquired by the print data acquisition unit 1893. A print setting acquisition unit 1892 instructs the print setting storage unit 1897 to store the print settings acquired by the print setting acquisition unit 1892. The print data storage unit 1898 stores the print data and notifies the storage location thereof to the print job notification unit 1896. The print setting storage unit 1897 stores the print settings and notifies the storage location thereof to the print job notification unit 1896.

The print job notification unit 1896 generates the notification information D in response to the reception of the notification of the storage locations from the print data storage unit 1898 and the print setting storage unit 1897. The print job notification unit 1896 transmits the notification information D to the relay virtual printer 1931 to the functional relay virtual printer 1933. The print job notification unit 1896 is a transmission unit based on a specification different from the specification defined by the first acquisition unit.

A description has been given of processing for registering the relay virtual printers 331 and 332 and the functional relay virtual printer 333 in the print service 340 with reference to the sequence diagram shown in FIG. 14. However, as is described below, the relay virtual printers 331 and 332 may also be registered in the print service 340 through the registration processing from the image forming device 110 and the image forming device 120. Since the configurations of the image forming device 120 and the print control unit 320 are the same as those of the image forming device 110 and the print control unit 310, the following description will be made regarding the image forming device 110 and the print control unit 310 only.

The display unit 401 (see FIGS. 3A and 3B) provided in the image forming device 110 displays various screens. The virtual printer management service information holding unit 402 has information indicating activation/inactivation of a virtual printer management service (service activation/inactivation information).

When a process for registering the image forming device 110 in the print service 340 is instructed from a user, the display unit 401 generates and displays a registration UI for the print service 340 as shown in FIG. 8C based on print service information shown in FIG. 7B.

A user inputs a user ID and a password to an input field 1021 and an input field 1022, respectively, on the registration UI shown in FIG. 8C, and then presses down a registration button 1023 for registration in the print service 340. The registration unit 403 (see FIGS. 3A and 3B) issues registration information to be registered in the print service 340 in response to the press-down of the activation button 1002 by a user. Next, the registration unit 403 transmits the issued registration information to be registered in the print service 340 to the request reception unit 501 provided in the relay virtual printer management service 330.

According to the first and second embodiments, the print system has a function in which the functional relay virtual printer 333 provides a print notification to the relay virtual printers 331 and 332 and the relay virtual printers 331 and 332 execute a process for acquiring print data and print settings upon reception of the print notification. However, print data and print settings to be acquired from the functional relay virtual printer 333 to the relay virtual printers 331 and 332 may not necessarily be the actual print data and print settings. For example, the relay virtual printers 331 and 332 may acquire reference information referring to print data and print settings.

Also, in the first and second embodiments, the final registration system has a function in which the print service printer generation unit 505 executes a process for registering information about the functional relay virtual printer 333 in the print service 340. During the process, the print service printer generation unit 505 transmits printer name, capabilities, and VPID to the print service 340. According to another embodiment, the capabilities of the functional relay virtual printer 333 may be the logical product or the logical sum of capabilities of an image forming device to be subjected to integrated printing or temporarily stored printing.

When capabilities are the logical product of capabilities of an image forming device to be subjected to integrated printing or temporarily stored printing, only the minimum print settings may be realized upon provision of a print instruction to the functional relay virtual printer 333 via the print service 340. However, it ensures that the print settings can be realized by any image forming device.

On the other hand, when capabilities are the logical sum of capabilities of an image forming device to be subjected to integrated printing or temporarily stored printing, the print settings can be realized as many as possible upon provision of a print instruction to the functional relay virtual printer 333 via the print service 340. However, the print settings may not be realized by a certain image forming device, and thus, the print settings need to be rounded as appropriate.

Also, in the first and second embodiments, the final registration function has a function in which the print service printer generation unit 505 executes a process for registering information about the functional relay virtual printer 333 in the print service 340. During the process, the print service printer generation unit 505 transmits the printer name, the capabilities, and the VPID of the functional relay virtual printer 333 to the print service 340. The printer name is, for example, special printing (FIG. 7C). However, a printer name may be the one that recalls the function of the functional relay virtual printer 333. For example, a printer name may be "integrated printing" or "temporarily stored printing". Also, it may be configured such that a printer name is automatically set upon registration of the functional relay virtual printer 333 depending on the function and the effect thereof.

Also, in the first and second embodiments, the functional relay virtual printer 333 only has one of either an integrated printing function or a temporarily stored printing function. However, a plurality of functions may be realized in the print relay server 130 by realizing a plurality of functional relay virtual printers. For example, a functional relay virtual printer having an integrated printing function and a functional relay virtual printer having a temporarily stored printing function may coexist in the print relay server 130. FIG. 17 is a diagram illustrating an example of a registration UI used for coexisting a functional relay virtual printer having an integrated printing function and a functional relay virtual printer having a temporarily stored printing function.

Also, due to the characteristics of the cloud computing environment, a user may not immediately grasp the print result when the user provides a print instruction to the print service 340. Thus, as the specification for the print service 340, the status of a print job is managed for improvement in usability and information about the status of a print job is displayed to a user via the Web application 360. For example, it is contemplated that the exemplary statuses of a print job are "in printing", "completed in printing", and the like. Due to such background, the print system may have a function in which a print completion notification may be returned from the print control unit 310 to the relay virtual printer 331, from the relay virtual printer 331 to the functional relay virtual printer 333, and from the functional relay virtual printer 333 to the print service 340 upon completion of printing.

Here, the print process according to the first embodiment is push printing and the print process according to the second embodiment is pull printing. Push printing means general print functions that can be executed by the image forming device 110 without the need for another print instruction after a print instruction is provided from the Web application 360. While, pull printing means general print functions that can be executed by the image forming device 110 with the need for another print instruction after a print instruction is provided from the Web application 360.

The print relay server 130 may be adopted to execute both push printing and pull printing. Then, the timing for returning a print completion notification from the functional relay virtual printer 333 to the print service 340 may be different between push printing and pull printing.

FIG. 20 is a sequence diagram illustrating an example of processing for providing a print instruction to an image forming device according to an embodiment for executing push printing and pull printing. The processes from step S2001 to step S2030 shown in FIG. 20 are the same as those from step S1501 to step S1530 shown in FIGS. 13 and 14. Also, the processes from step S2050 to step S2062 shown in FIG. 20 are the same as those from step S2020 to step S2032 shown in FIG. 20.

When the print relay server 130 executes push printing, a print completion notification is returned from the functional relay virtual printer 333 to the print service 340 after all printing has been completed. In other words, when the print control unit 310 returns a print completion notification to the relay virtual printer 331 and the relay virtual printer 331 returns the print completion notification to the functional relay virtual printer 333, the functional relay virtual printer 333 returns the print completion notification to the print service 340.

When the print relay server 130 executes pull printing, the functional relay virtual printer 333 returns the print completion notification to the print service 340 in S2048 upon acquisition of a print job. Thus, the functional relay virtual printer 333 includes a notification unit (not shown) that executes the following processing upon acquisition of print data corresponding to the temporarily stored printing function from the print server 140 to the print server 140. The notification unit notifies the completion of printing to the print server 140 before the print job notification unit 766 serving as the print instruction unit instructs an image forming device, which executes a process for realizing the temporarily stored printing function via a relay virtual printer, to print out print data.

The reason why the functional relay virtual printer 333 returns a print completion notification to the print service 340 upon acquisition of a print job will be described below. When the print relay server 130 executes pull printing, the timing at which another print instruction is provided may not be ensured after the provision of a pull print instruction in S2049. In such a case, print data in processing may retain in the print service 340, resulting in the occurrence of an error such as time-out of print process or the like depending on the specification for the print service 340. If the functional relay virtual printer 333 returns a print completion notification to the print service 340 upon acquisition of a print job, the occurrence of error such as time-out or the like in the print service 340 may be prevented.

In the first and second embodiments, information to be communicated in the content printing system 1000 is information represented in XML format as shown in FIG. 9. Information to be communicated in the content printing system 1000 may be information represented in another format. For example, information to be communicated in the content printing system 1000 may be represented in JSON format instead of XML format.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-122027 filed on May 31, 2011, which is hereby incorporated by reference herein in its entirety.

What is claimed is:

1. An information processing apparatus communicable via a network with an image forming device and a print server that generates print data based on a print request received from a user device via the network, wherein the print server is provided by a first vendor that releases a unique specification for executing data communication between the print server and the image forming device, comprising:

a relay virtual printer unit that corresponds to the image forming device and instructs the corresponding image forming device to print out print data generated by the print server; and a functional relay virtual printer unit that has a function for realizing a specified print service not provided by the print server and for responding to a print request from the user device, wherein the relay virtual printer unit comprises:

a receiving unit configured to acquire, in response to the print server receiving a printing instruction input by a user via the user device, print data from the print server according to a first specification, which is the unique specification of the first vendor that also is for data communication between the print server and the information processing apparatus; and a transmission unit configured to transmit the print data acquired by the receiving unit from the relay virtual printer unit to the image forming device according to a second specification which is for executing data communication between the information processing apparatus and the image forming device, wherein the second specification is released by a second vendor that provides the information processing apparatus and is other than the first vendor, and wherein the functional relay virtual printer unit comprises:
a print data acquisition unit that acquires print data from the print server which has generated the print data in response to a print request from the user device; and
a print instruction unit that executes a process for realizing the specified print service not provided by the print server, and instructs the image forming device to print the print data via the transmission unit of the relay virtual printer unit
wherein the functional relay virtual printer unit has a temporarily stored printing function that stores the print data acquired from the print server when a print request is made by the user device and instructs the image forming device to print the stored print data upon reception of a print instruction from the image forming device,
wherein the print server generates a print job in response to a print request by the user device and notifies the print job to the functional relay virtual printer unit,
wherein the functional relay virtual printer unit acquires the print data in response to the print job from the print server and transmits the acquired print data to the relay virtual printer unit corresponding to each of image forming devices upon reception of a print instruction from the image forming devices which execute a process for realizing the specified print service not provided by the print server, and
wherein each of the relay virtual printer units, which has received the print data from the functional relay virtual printer unit, instructs the corresponding image forming device to print the print data.

2. The information processing apparatus according to claim 1, wherein each of the relay virtual printer unit and the functional relay virtual printer unit corresponds to a communication protocol which is open to the public to provide a print service by the print server.

3. The information processing apparatus according to claim 1, wherein the print server registers the relay virtual printer unit and the functional relay virtual printer unit as printers running on the information processing apparatus.

4. The information processing apparatus according to claim 1, wherein the print data acquisition unit communicates with a transmission unit which is provided in the print server and which transmits the print data, and
wherein the print instruction unit communicates with a unit that is provided in the relay virtual printer unit and which instructs the image forming device to print the print data.

5. The information processing apparatus according to claim 1, wherein the functional relay virtual printer unit has an integrated printing function that instructs the image forming device to print the print data acquired from the print server when a one-time print request is made by the user device.

6. The information processing apparatus according to claim 5, wherein the functional relay virtual printer unit has the integrated printing function,
wherein the print server generates a print job in response to a one-time print request by the user device and notifies the print job to the functional relay virtual printer unit,
wherein the functional relay virtual printer unit acquires the print data in response to the print job from the print server and transmits the acquired print data to the relay virtual printer unit corresponding to each of image forming devices which execute a process for realizing the specified print service not provided by the print server, and
wherein each of the relay virtual printer units, which has received print data from the functional relay virtual printer unit, instructs the corresponding image forming device to print the print data.

7. The information processing apparatus according to claim 1, wherein the functional relay virtual printer unit has the temporarily stored printing function, and notifies the completion of printing to the print server upon acquisition of the print data from the print server before the print data is transmitted to the relay virtual printer unit corresponding to an image forming device which executes a process for realizing the specified print service not provided by the print server.

8. A print control method performed by an information processing apparatus communicable via a network with an image forming device and a print server that generates print data based on a print request received from a user device via the network, wherein the print server is provided by a first vendor that releases a unique specification for executing data communication between the print server and the image forming device,
wherein the information processing apparatus comprises:
a relay virtual printer unit that corresponds to the image forming device and instructs the corresponding image forming device to print out print data generated by the print server; and
a functional relay virtual printer unit that has a function for realizing a specified print service not provided by the print server and for responding to a print request from the user device, and
wherein the method comprises:
in the relay virtual printer unit,
acquiring, in response to the print server receiving a printing instruction input by a user via the user device, print data from the print server according to a first specification, which is the unique specification of the first vendor that also is for data communication between the print server and the information processing apparatus; and
transmitting the acquired print data from the relay virtual printer to the image forming device according to a second specification which is for executing data communication between the information processing apparatus and the image forming device, wherein the second specification is released by a second vendor that provides the information processing apparatus and is other than the first vendor,
in the functional relay virtual printer unit,
acquiring print data from the print server which has generated the print data in response to a print request from the user device; and
instructing the image forming device to print the print data via the relay virtual printer unit so as to execute a process for realizing the specified print service not provided by the print server,
wherein the functional relay virtual printer unit has a temporarily stored printing function that stores the print data acquired from the print server when a print request is made by the user device and instructs the image forming device to print the stored print data upon reception of a print instruction from the image forming device,
wherein the print server generates a print job in response to a print request by the user device and notifies the print job to the functional relay virtual printer unit,
wherein the functional relay virtual printer unit acquires the print data in response to the print job from the print server and transmits the acquired print data to the relay virtual printer unit corresponding to each of image forming devices upon reception of a print instruction from the image forming devices which execute a process for realizing the specified print service not provided by the print server, and wherein each of the relay virtual printer units, which has received the print data from the functional relay virtual printer unit, instructs the corresponding image forming device to print the print data.

9. A non-transitory computer readable storage medium on which is stored a computer program for making a computer execute a print control method performed by an information processing apparatus communicable via a network with an image forming device and a print server that generates print data based on a print request received from a user device via the network, wherein the print server is provided by a first vendor that releases a unique specification for executing data communication between the print server and the image forming device, wherein the information processing apparatus comprises:

a relay virtual printer unit that corresponds to the image forming device and instructs the corresponding image forming device to print out print data generated by the print server; and a functional relay virtual printer unit that has a function for realizing a specified print service not provided by the print server and for responding to a print request from the user device, and wherein the program comprises:

in the relay virtual printer unit, acquiring, in response to the print server receiving a printing instruction input by a user via the user device, print data from the print server according to a first specification, which is the unique specification of the first vendor that also is for data communication between the print server and the information processing apparatus; and transmitting the acquired print data from the relay virtual printer to the image forming device according to a second specification which is for executing data communication between the information processing apparatus and the image forming device, wherein the second specification is released by a second vendor that provides the information processing apparatus and is other than the first vendor;

in the functional relay virtual printer unit, acquiring print data from the print server which has generated the print data in response to a print request from the user device; and instructing the image forming device to print the print data via the relay virtual printer unit so as to execute a process for realizing the specified print service not provided by the print server, wherein the functional relay virtual printer unit has a temporarily stored printing function that stores the print data acquired from the print server when a print request is made by the user device and instructs the image forming device to print the stored print data upon reception of a print instruction from the image forming device, wherein the print server generates a print job in response to a print request by the user device and notifies the print job to the functional relay virtual printer unit, wherein the functional relay virtual printer unit acquires the print data in response to the print job from the print server and transmits the acquired print data to the relay virtual printer unit corresponding to each of image forming devices upon reception of a print instruction from the image forming devices which execute a process for realizing the specified print service not provided by the print server, and wherein each of the relay virtual printer units, which has received the print data from the functional relay virtual printer unit, instructs the corresponding image forming device to print the print data.

\* \* \* \* \*